US006173226B1

(12) United States Patent
Yoshida et al.

(10) Patent No.: US 6,173,226 B1
(45) Date of Patent: *Jan. 9, 2001

(54) CONTROL APPARATUS AND METHOD FOR POWERTRAIN OF A VEHICLE

(75) Inventors: Yoshiyuki Yoshida, Hitachi; Toshimichi Minowa, Toukai-mura; Hiroshi Kuroiwa, Hitachi; Masahiko Ibamoto; Mitsuhiro Masuda, both of Hitachinaka, all of (JP)

(73) Assignee: Hitachi, Ltd., Tokyo (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/027,907

(22) Filed: Feb. 23, 1998

Related U.S. Application Data

(63) Continuation of application No. 08/468,428, filed on Jun. 6, 1995.

(30) Foreign Application Priority Data

Jun. 6, 1994 (JP) .................................................. 6-123545
Jul. 25, 1994 (JP) .................................................. 6-172280

(51) Int. Cl.[7] .................................................. G06F 17/00
(52) U.S. Cl. .................................. 701/51; 701/53; 701/54; 701/58; 477/125; 477/105; 477/110
(58) Field of Search .......................... 701/51, 53, 54, 701/59, 58; 477/62, 110, 43, 63, 78, 108, 109, 111, 30, 125, 54, 159; 192/3.58, 3.62

(56) References Cited

U.S. PATENT DOCUMENTS

| 5,150,635 | * | 9/1992 | Minowa et al. | 74/335 |
| 5,184,527 | | 2/1993 | Nakamura | 477/110 |
| 5,343,781 | * | 9/1994 | Minowa et al. | 477/107 |
| 5,476,425 | * | 12/1995 | Shiraishi et al. | 477/109 |
| 5,496,227 | * | 3/1996 | Minowa et al. | 477/62 |
| 5,508,923 | * | 4/1996 | Ibamoto et al. | 364/426.01 |
| 5,573,476 | * | 11/1996 | Minowa et al. | 477/109 |
| 5,580,330 | * | 12/1996 | Minowa et al. | 477/92 |
| 5,580,331 | * | 12/1996 | Shiraishi et al. | 477/109 |
| 5,608,626 | * | 3/1997 | Ibamoto et al. | 364/424.08 |
| 5,613,920 | | 3/1997 | Uno et al. | 477/109 |
| 5,695,427 | | 12/1997 | Sato et al. | 477/43 |
| 5,785,627 | | 7/1998 | Uno et al. | 477/109 |
| 5,938,712 | | 8/1999 | Ibamoto et al. | 701/54 |

\* cited by examiner

Primary Examiner—Jacques H. Louis-Jacques
(74) Attorney, Agent, or Firm—Evenson, McKeown, Edwards & Lenahan, P.L.L.C.

(57) ABSTRACT

A control apparatus and method for a powertrain of a vehicle provided with a drive unit which has the powertrain including an engine or an electric motor and an automatic transmission, and a driving shaft. The control apparatus is provided with first torque estimating means for obtaining a first estimated driving shaft torque, second torque estimating unit for obtaining a second estimated driving shaft torque used to correct said first estimated driving shaft torque, comparison means for comparing said first estimated driving shaft torque with said second estimated driving shaft torque, and driving shaft torque calculating means for calculating a driving shaft torque on the basis of the result of the comparison.

18 Claims, 28 Drawing Sheets

CONTROL APPARATUS AND METHOD FOR POWERTRAIN OF A VEHICLE

This application is a continuation of application Ser. No. 08/468,428, filed Jun. 6, 1995 now pending.

BACKGROUND OF THE INVENTION

The present invention relates to a control apparatus and method for the powertrain of a vehicle having an engine or an electric motor and an automatic transmission, and a driving shaft.

Generally, in order to control precisely the powertrain of a vehicle, it is desirable to control it by using the driving shaft torque. In the prior art, because it is difficult to detect directly the driving shaft torque, the control of an automatic transmission is performed briefly by detecting the opening of a throttle valve for adjusting the amount of air taken into the engine of the vehicle, and the vehicle speed.

Recently, there is known a technique in which the driving shaft torque is calculated and estimated based on the characteristics of a torque converter using the speed ratio of the engine speed to the turbine speed as the parameters.

Because the control value is obtained from the opening of the throttle valve and the vehicle velocity, there is a problem that it is difficult to control precisely the transmission as compared with the method using the driving shaft torque. Further, In another method in which the driving shaft torque is calculated and estimated by using the characteristics of the torque converter, the driving shaft torque is calculated and estimated on the basis of the data table of the torque converter characteristics obtained by the experiments when the vehicle was developed. Therefore, even if the fluid in the torque converter deteriorates with age, the change in the torque converter characteristics may not be considered in the above method. As a result, the difference occurs between the calculated and estimated value of the driving shaft torque after the change with age and the actual value of the driving shaft torque. Accordingly, it is difficult to control precisely the transmission.

SUMMARY OF THE INVENTION

An object of the present invention is to provide a control apparatus and a control method for a powertrain in a vehicle which can consider and correct a change of the powertrain with age, and improve the precision of the estimated value of the driving shaft torque.

In order to attain the above object, a control apparatus for a powertrain of a vehicle according to a first aspect of the present invention is provided with a drive unit which has an engine or an electric motor and an automatic transmission, and a driving shaft, and further comprises first torque estimating means for obtaining a first estimated driving shaft torque, second torque estimating means for obtaining a second estimated driving shaft torque used to correct said first estimated driving shaft torque, comparison means for comparing the first estimated driving shaft torque with the second estimated driving shaft torque, and driving shaft torque calculating means for calculating a driving shaft torque on the basis of the result of the comparison.

A control apparatus for a powertrain of a vehicle according to a second aspect of the present invention comprises first torque estimating means for obtaining a first estimated driving shaft torque, second torque estimating means for obtaining a second estimated driving shaft torque used to correct said first estimated driving shaft torque, learning and correcting means for comparing and learning said first estimated driving shaft torque with said second estimated driving shaft torque, and determining the start of the correction of said first estimated driving shaft torque.

In a control apparatus for a powertrain of a vehicle according to a third aspect of the present invention, the learning and correcting means determines the deviation between the first estimated drive shaft torque and the second estimated drive shaft torque each obtained at a first time point, determines the deviation between the first estimated driving shaft torque obtained by said first torque estimating means and the second estimated driving shaft torque obtained by said second torque estimating means each obtained at a second time point when the value of said second estimated driving shaft torque becomes equal to the value estimated at the first time point, detects the start of the correction when the difference between said first deviation and said second deviation became larger than a predetermined value, and corrects said first estimated driving shaft torque.

In a control apparatus for a powertrain of a vehicle according to a fourth aspect of the present invention, said first torque estimating means estimates the torque by using the characteristics of a torque converter.

It is desirable that the first torque estimating means estimates the torque by using the characteristics of the torque of the driving shaft, and comprises a torque sensor mounted on the driving shaft. Alternatively, the second torque estimating means estimates the torque by using signals detected from a vehicle weight detecting means and an acceleration detecting means.

Further, it is desirable that the second torque estimating means estimates a change in the vehicle weight by detecting when the vehicle speed is continuously equal to zero during a predetermined time period. The learning and correcting means inputs either one of a steering angle signal and a road condition detection signal (or both signals). A float signal for detecting the residual fuel is used as the road condition detection signal, or the learning and correcting means inputs a road condition detecting signal.

Furthermore, it is desirable that the road condition detecting signal uses a float signal for detecting the residual fuel in a fuel tank. In this case, the learning and correcting means inputs a steering angle to determine the start of the learning, and the learning and correcting applies an abnormality detecting signal such as an alarm signal from the outside.

According to another aspect of the present invention, a powertrain of a vehicle is provided with a drive unit which has an engine or an electric motor and an automatic transmission, and a driving shaft. The control apparatus comprises a vehicle speed detecting means for determining the stop of the vehicle, and a comparison means for comparing an acceleration for the output torque before the stop of the vehicle with that after the restart of the vehicle.

A control apparatus for a powertrain of a vehicle according to a further aspect of the present invention comprises vehicle weight calculating means for calculating the vehicle weight by using speeds and accelerations detected at different time points.

A control apparatus for a powertrain of a vehicle according to another aspect of the present invention comprises initial value storing means for storing the relationship between the acceleration of the vehicle and the driving shaft torque outputted by said drive means as an initial value.

In a preferred embodiment of the invention, the initial value storing means stores a first torque, and a torque calculating means determines a second torque. A torque comparing means compares the first torque with the second torque, and the said second torque is corrected by the relative value or the absolute value obtained in accordance with the result of the comparison by said torque comparing means.

In another preferred embodiment of the invention, the control apparatus for the powertrain of a vehicle according to the invention further comprises correction completion detecting means for detecting the completion of the correction of said second torque, and inhibition means for inhibiting the application of the second torque when the completion of the correction is not detected.

In still another preferred embodiment of the invention, the control apparatus for the powertrain of a vehicle further comprises initial value setting means for renewing the initial value of the first torque stored in the initial value storing means. The second torque is obtained by using the value renewed by the initial value setting means.

It is also desirable that the torque calculating means calculates the torque by using the characteristics of a torque converter obtained at different oil temperatures. The characteristics of the torque converter are corrected by using the result of the comparison in said torque comparing means. The characteristics of the torque converter at the different oil temperatures are corrected by using the erroneous characteristics between the torque converters which are corrected in consideration of the individual difference between the powertrains, or the second torque is corrected by using the characteristics of said torque converter.

A control apparatus for a powertrain of a vehicle according to another aspect of the present invention comprises first torque calculating means for calculating a first driving shaft torque based on an input signal received at a first time point, the input signal being at least one of engine speed, turbine speed, driving shaft torque, vehicle speed, steering angle, road condition, vehicle weight, and oil temperature in the torque converter. A second torque calculates means for calculating a second driving shaft torque by using the input signal received at a second time point later than the first time point, and a third torque calculating means calculates an estimated driving shaft torque by correcting the second driving shaft torque with the first driving shaft torque, whereby said powertrain is controlled by using said estimated driving shaft torque.

Other objects, advantages and novel features of the present invention will become apparent from the following detailed description of the invention when considered in conjunction with the accompanying drawings.

DETAILED DESCRIPTION OF THE PREFERRED EMBODIMENTS

The embodiments of the present invention will be explained hereinafter with reference to the attached drawings.

Figure 1:
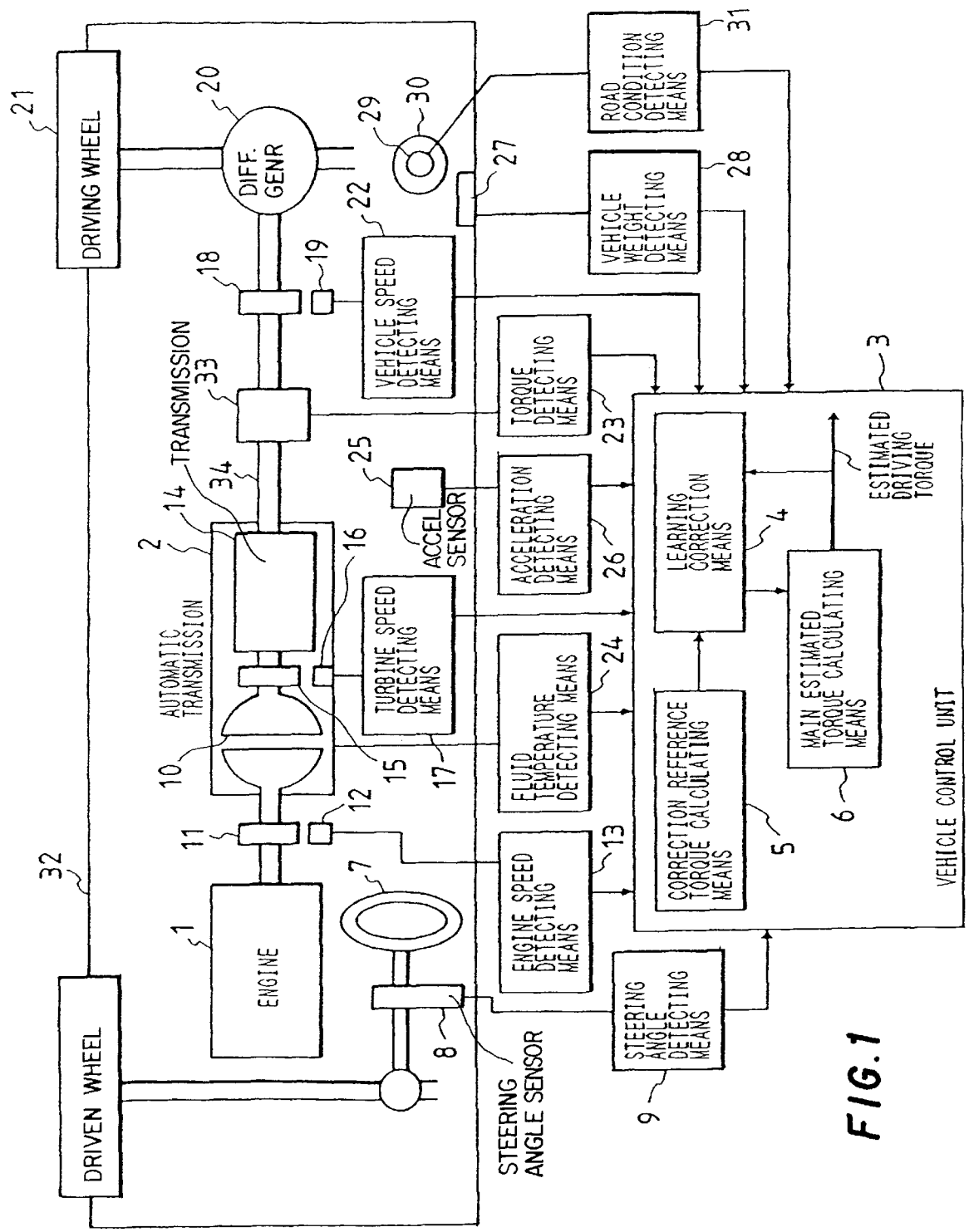
FIG. 1 is a schematic view of the whole control apparatus according to the present invention.

FIGS. 1 to 10 show a first embodiment of the present invention. FIG. 1 shows the whole schematic view of the control equipment. In FIG. 1, the control apparatus according to the first embodiment of the present invention comprises an engine 1, such as an internal combustion engine, a lean burn type of internal combustion engine, an in-cylinder injection type of engine, etc. or an electric motor, a vehicle 32 including an automatic transmission 2 having a torque converter 10 and a transmission 14, and a vehicle control unit 3. while the vehicle control unit 3 is outside of the vehicle 32 in FIG. 1 for the convenience of the explanation, it should be understood that the control unit 3 is mounted inside of the vehicle 32.

The vehicle control unit 3 is provided with learning correction means 4 for correcting the estimated driving shaft torque, correction reference torque calculating means 5 (a second torque estimating means for calculating the torque of correction reference), and main estimated torque calculating means 6 which is a first torque estimating means for calculating the estimated driving shaft torque used for a vehicle control. In the correction reference torque calculating means 6, the torque calculating methods are basically different from each other, in order to compare one with the other. As the torque calculating methods, there are various methods such as an engine characteristic method in which the driving shaft torque is calculated by using the throttle valve opening and the engine speed, a method in which it is calculated by using the torque characteristics of a torque converter 10, a method in which both characteristics of the engine and the torque converter are combined with each other, a method in which the driving shaft torque To is calculated by using the total sum of the running torque Tc, acceleration torque Tα and the grade torque Tγ (as shown in the equation (1 below), and a method in which the torque is directly detected by a torque sensor.

$$To = T\alpha + T\gamma + Tc \qquad (1)$$

In order to calculate the torque, it is required to detect the state of the vehicle 32. Therefore, the vehicle 32 includes steering angle detecting means 9 for detecting the operating amount of a steering wheel 7 by a steering angle sensor 8 mounted on the steering shaft, engine speed detecting means 13 for detecting the engine speed by a speed sensor 12 which comprises an electomagnetic pickup and a gear 11 mounted between an input shaft of the torque converter 10 and an output shaft of the engine 1, a turbine speed detecting means 17 for detecting the rotational frequency (hereinafter referred to as the turbine speed) of the output shaft of the torque converter by a speed sensor 16 which comprises an electromagnetic pickup and a gear 15 mounted between the torque converter 10 and a transmission 14, vehicle speed detecting means 22 for detecting the speed of vehicle by a speed sensor 19 which comprises an electromagnetic pickup and a gear 18 mounted in the neighborhood of a driving wheel 21 or between a driving shaft 34 of the transmission 14 and a differential gear 20, torque detecting means 23 for detecting the torque of the driving shaft of the vehicle based on phase differences, the distortion of the driving shaft 34, and so on obtained by a torque sensor 33, fluid temperature detecting means 24 for detecting the temperature of the fluid inside of the torque converter 10, acceleration detecting means 26 for detecting the acceleration of the vehicle by an acceleration sensor 25, vehicle weight detecting means 28 for detecting the weight of the vehicle 32 by using the displacement of a vehicle height sensor 27, road condition detecting means 31 for detecting the conditions of the road by using a signal indicative of the expansion of a suspension 30 and a signal indicative of the attenuation of a shook absorber mounted on the vehicle.

In the vehicle control unit 3, the torque calculated by the torque calculating means 5 and 6 are inputted into learning correction means 4, and the start of the learning is determined. The correction in the main estimated torque calculating means 6 is started, and the estimated driving shaft torque is corrected. As a result, the precision of the estimation of the driving shaft can be improved.

In certain instances, it is possible to calculate the output of one of the detectors by using the outputs of another detector, so that all the detectors are not necessary. Namely, in a certain system, the outputs of all of the detectors are not inputted to the control unit 3; rather, those of some detectors, which supply the parameters necessary for the correction reference torque calculating means 5 and the main estimated torque calculating means 6 are selected, combined, and inputted to the vehicle control unit.

For each detecting means, the parameters, which can be detected or estimated from a combination of parameters obtained by different detecting means will now be explained.

The turbine speed can be detected not only by using turbine speed detecting means 17 and a speed sensor 16 as shown in FIG. 1, but also by the following equation (2) in which the vehicle speed is detected by vehicle speed detecting means 22. In equation (2), Nt is the turbine speed, Vsp is the vehicle speed, Gr is the gear ratio, Gf is the final gear ratio, and Rw is the radius of the driving wheel.

$$Nt = (Vsp \cdot Gr \cdot Gf \cdot 1000)/(2 \cdot \pi \cdot Rw \cdot 60) \qquad (2)$$

Figure 2:
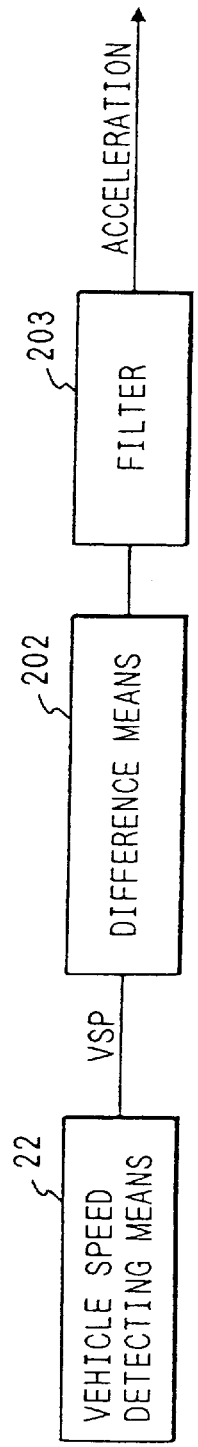
FIG. 2 is a block diagram for calculating the acceleration.

It is also possible to detect the acceleration without using the acceleration detecting means 26 shown in FIG. 1. FIG. 2 shows a block diagram to calculate the acceleration. In vehicle speed detecting means 22, a speed signal is converted and the vehicle speed is obtained. Next, in the vehicle control unit 3, the acceleration is estimated by using a differentiator 202 and a filter 203 (to decrease the noise).

Figure 3:
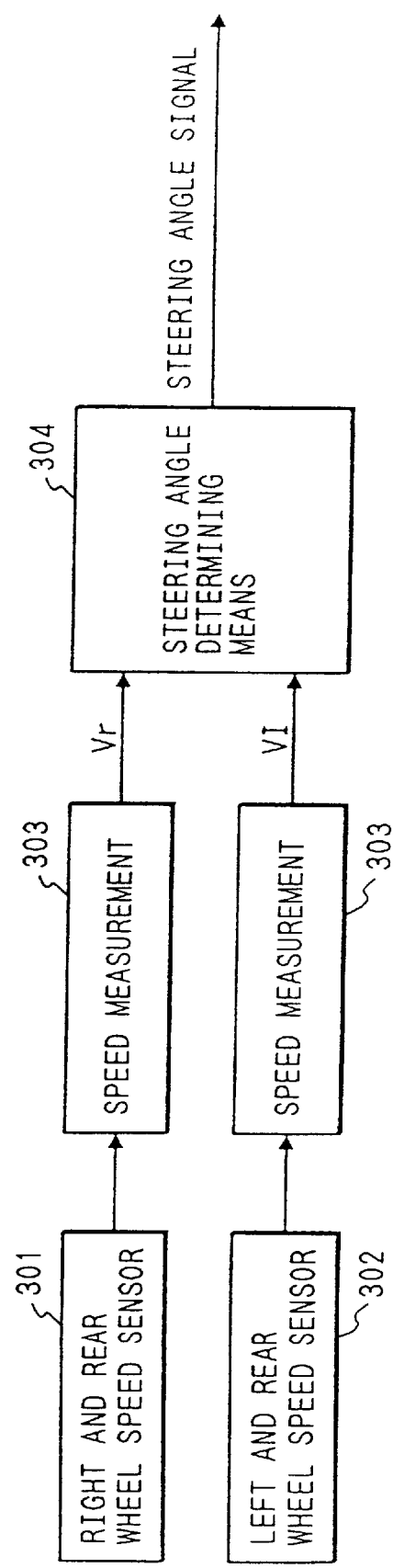
FIG. 3 is a block diagram far detecting the steering angle.
Figure 4:
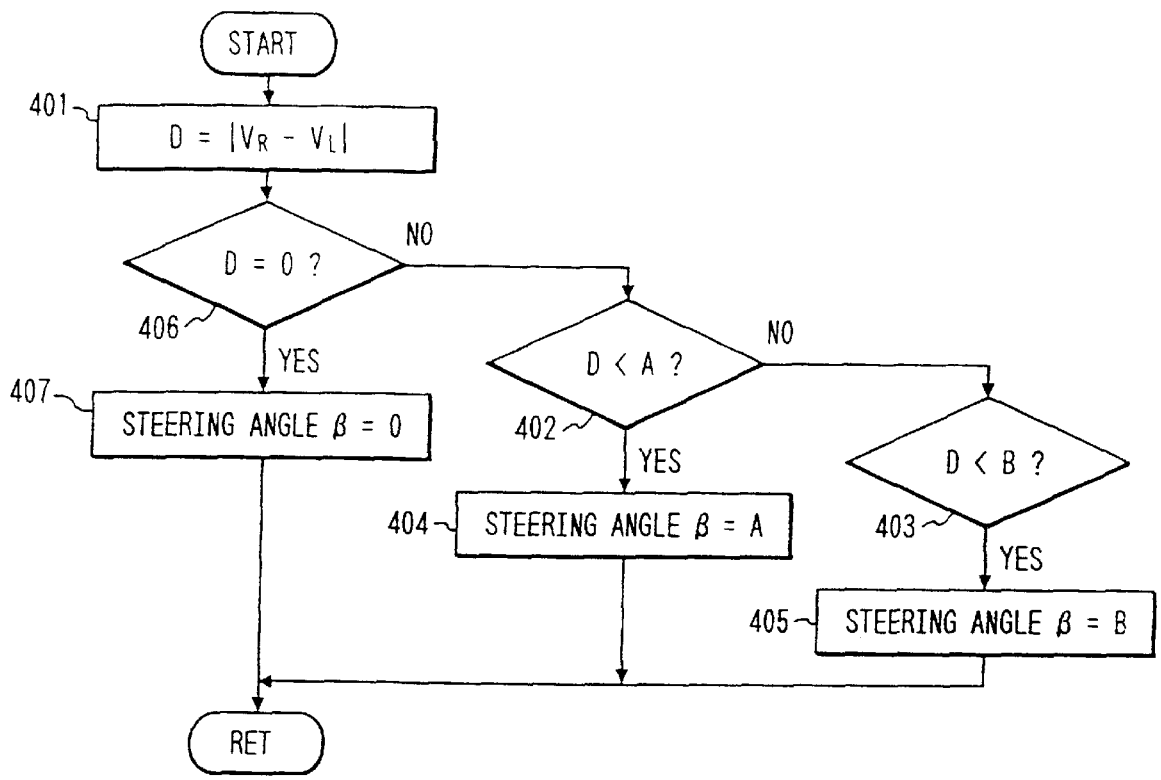
FIG. 4 is a flow chart for determining the steering angle.

The steering wheel angle can be determined without the steering angle sensor 8 shown in FIG. 1. FIG. 3 shows a block diagram to detect the steering angle. In the case of a vehicle in which the rear wheels are driven, the steering angle can be obtained by measuring the cyclic period or the frequency of the signal obtained from wheel speed sensors 301 and 302 mounted in the neighborhood of the right and left driving wheels, measuring the rotation speed Vr and Vl by using speed measurements 303, and producing the steering angle signal by a steering angle determining means 304 on the basis of the obtained Vr and Vl. FIG. 4 shows a flow chart to determine the steering angle. The outer driving wheels of the vehicle rotate faster than the inner driving wheels. At step 401, the speed difference D between the obtained rotation speeds Vr and V1 is obtained. If the speed difference D is not zero (step 406) it is compared with a certain predetermined value A or B at steps 402 and 403. At each of steps 404 and 405, the steering angle β corresponding to the speed difference D is determined. If the speed difference D is equal to 0 at step 406, then the steering angle β=0 is obtained at step 407, which indicates a straight drive.

There is another method of detecting the steering angle, in which the rotation angular velocity (yaw rate) relative to the vertical direction of the vehicle is detected. The magnitude of the detected value during turning to the right or left is used in place of the value corresponding to the speed difference D as explained at step 401 of FIG. 4, and compared with the predetermined value. As a result, the steering angle can be determined.

Figure 5:
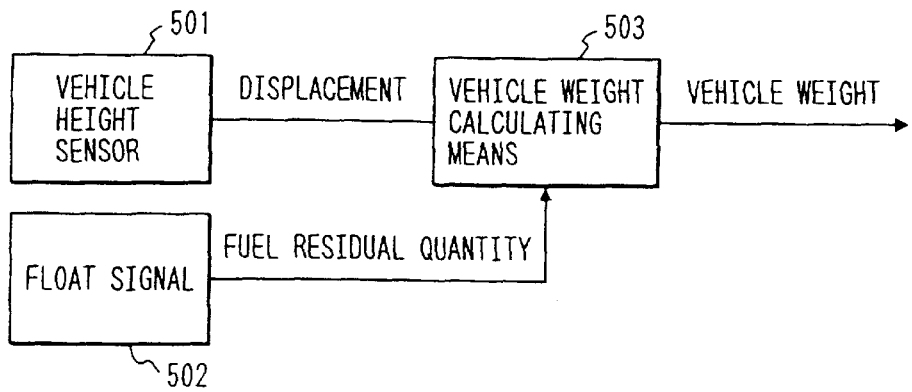
FIG. 5 is a block diagram for detecting the weight of a vehicle.

FIG. 5 shows a block diagram for detecting the vehicle weight in a vehicle weight detecting means 28. First, by using the height of vehicle in which the vehicle is not loaded as a standard height, the displacement of the distance in the lower direction between the vehicle body and the suspension and shock absorber is detected by vehicle sensors 27 and 501 when the change in the vehicle weight occurs. On the other hand, the fuel residual quantity is obtained from a float signal 502. The value corresponding to the fuel residual quantity is inputted to vehicle weight calculating means 503, and the vehicle weight is detected.

Figure 6:
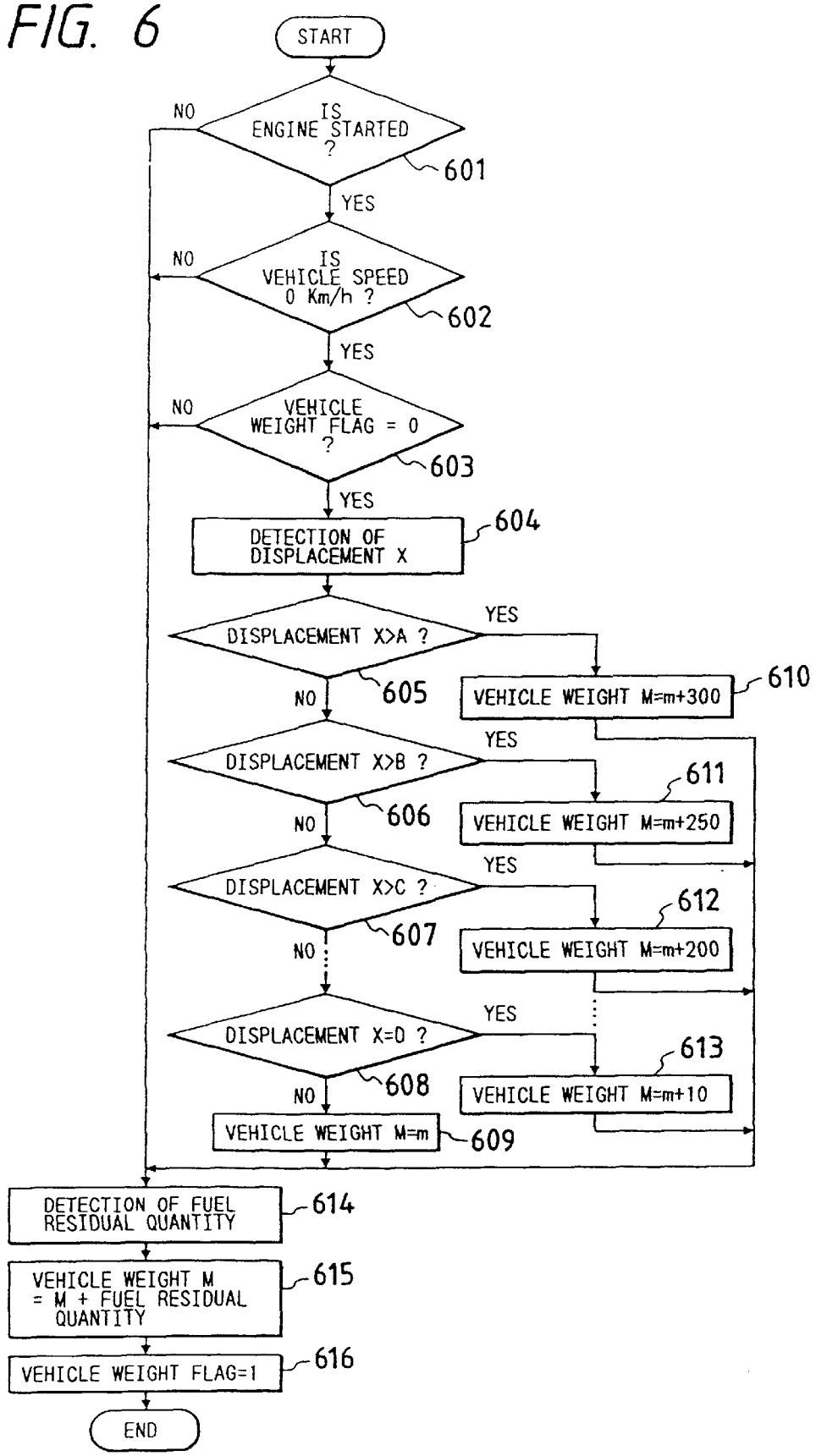
FIG. 6 is a flow chart for calculating the vehicle weight.

FIG. 6 shows a flow chart for calculating the vehicle weight. At steps 601 to 603, it is confirmed that the engine has been started, that the vehicle is not moving, and that the vehicle weight flat (step 616) has not already been set. The calculation of the vehicle weight is carried out when the vehicle speed is 0 km/h, that is, the vehicle is stopping and the vehicle weight flag is equal to 0 which indicates the completion of the calculation of the vehicle weight. If the condition is satisfied, then the displacement X of the vehicle height is detected at step 604. The processing advances to step 605, in which if the displacement X is larger than the predetermined value, then the vehicle weight M is set to vehicle weight m+300 kg. (where, the predetermined value A is, for example, the displacement of the height of the vehicle in which five persons, 300 kg in all, are on board). Otherwise, the displacement X is compared with the predetermined value B. the vehicle weight corresponding to the displacement X is calculated through step 607 or steps 608 and 609. If displacement X is smaller than the predetermined value D (D is close limitlessly to 0), then the vehicle weight n is set to the weight m of the vehicle body at step 609. In this condition, while the engine is started, nobody is on board. Next, the fuel residual quantity is detected at step 614. The weight corresponding to the residual quantity is added to the vehicle body weight at step 615. Finally, the vehicle weight flag is set to 1 (step 616), and then the processing is completed.

Figure 7:
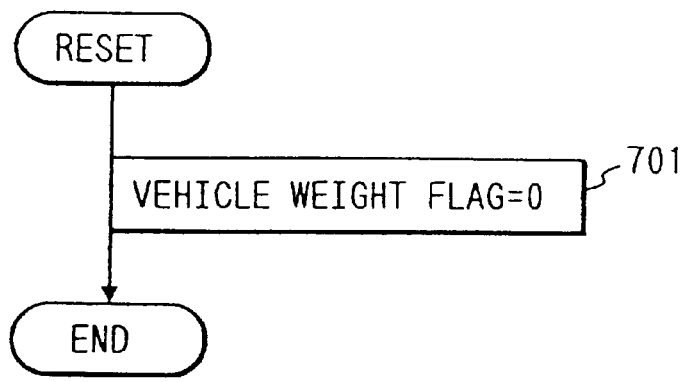
FIG. 7 is a flow chart of the RESET processing for clearing the vehicle weight flag.

When the door or the tank is opened or closed, or the engine is re-started, during the engine operating, a change in the vehicle weight may occur. Therefore, at the time when any one of the above conditions was satisfied, the RESET processing is performed and the vehicle weight flag is set to 0. Just after the vehicle stopped, the calculation of the vehicle weight of FIG. 6 is carried out again. FIG. 7 shows a flow chart of an example of the RESET processing in which the vehicle weight flag is cleared.

Figure 8:
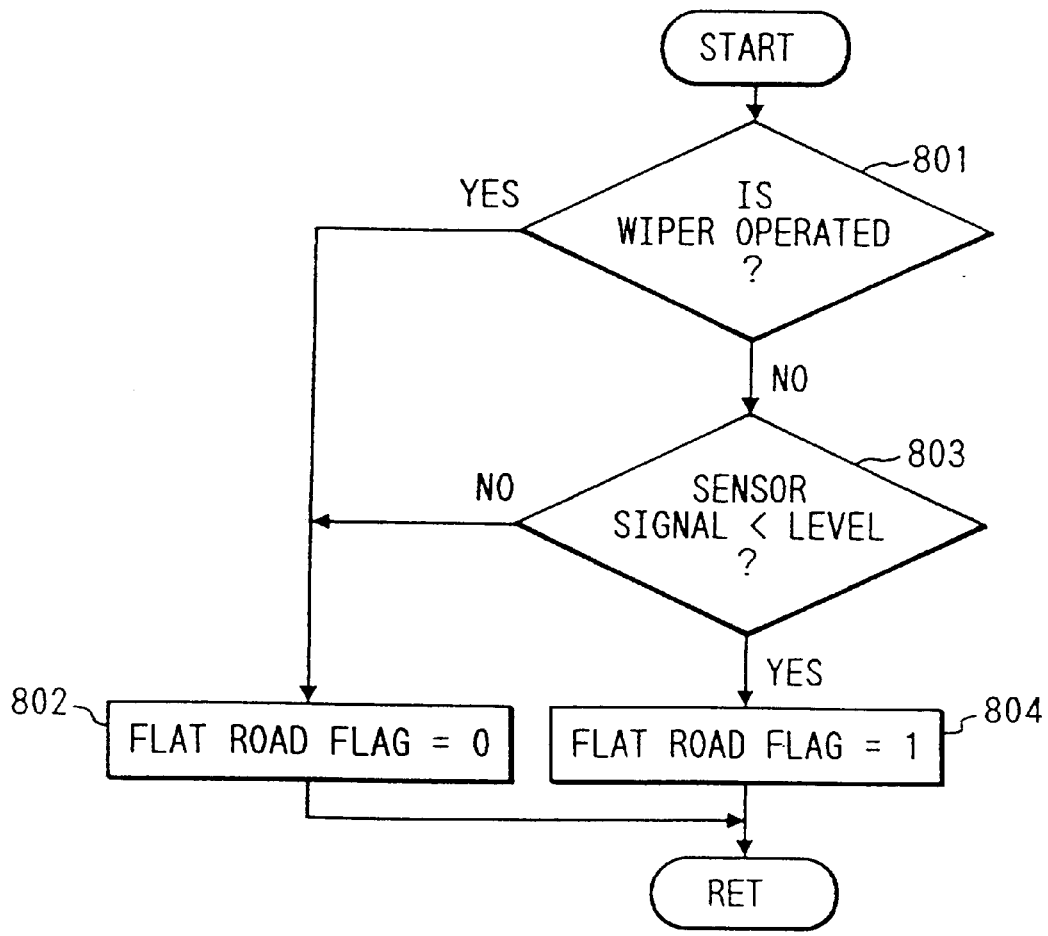
FIG. 8 is a flow chart for detecting the road conditions.
Figure 9:
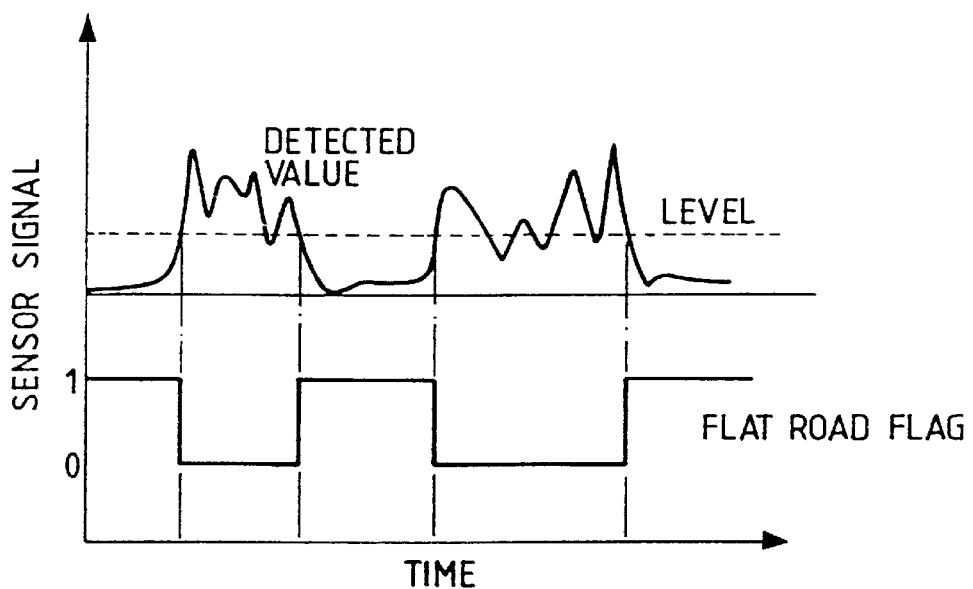
FIG. 9 is a diagram showing the relationship between an output of a sensor for detecting the irregularity of the road surface and a flat road flag.

FIG. 8 shows a flow chart for detecting the road conditions, and FIG. 9 shows the relationship between an output signal of a sensor for detecting the irregularity of the road surface and a flat road signal. The road condition is detected by processing the output signal from the road condition detecting means shown in FIG. 1 according to the flow chart show n in FIG. 8. If the running resistance (rolling resistance) is different from the value of the data table in the vehicle control unit 3, that is, the road is in the wet conditions or remarkably irregular, it is desirable not to perform the learning or the correction of the estimated torque. If the wiper is operated at step 801, then it is determined that the road is wet, and the flat road flag is set to "0" at step 802, which indicate whether or not the learning can be performed. If the wiper is not operated at step 801 and the output signal of the sensor for detecting the irregularity of the road is less than the predetermined level, then the vehicle is running on the flat road and the flat road flag is set to "1" at step 804. A pressure sensor or an acceleration sensor can be used to detect the road conditions, in which the pressure sensor is provided in a shock absorber. If the detected value of the sensor became larger than the predetermined level designated by the dotted line in FIG. 9, then the flat road flag is set to "0", otherwise, it is set to "1". Because the road conditions change momentarily as shown in FIG. 9, the learning of the estimated driving torque should be performed when the road is stable, namely, the flat road flag is equal to "1".

Figure 10:
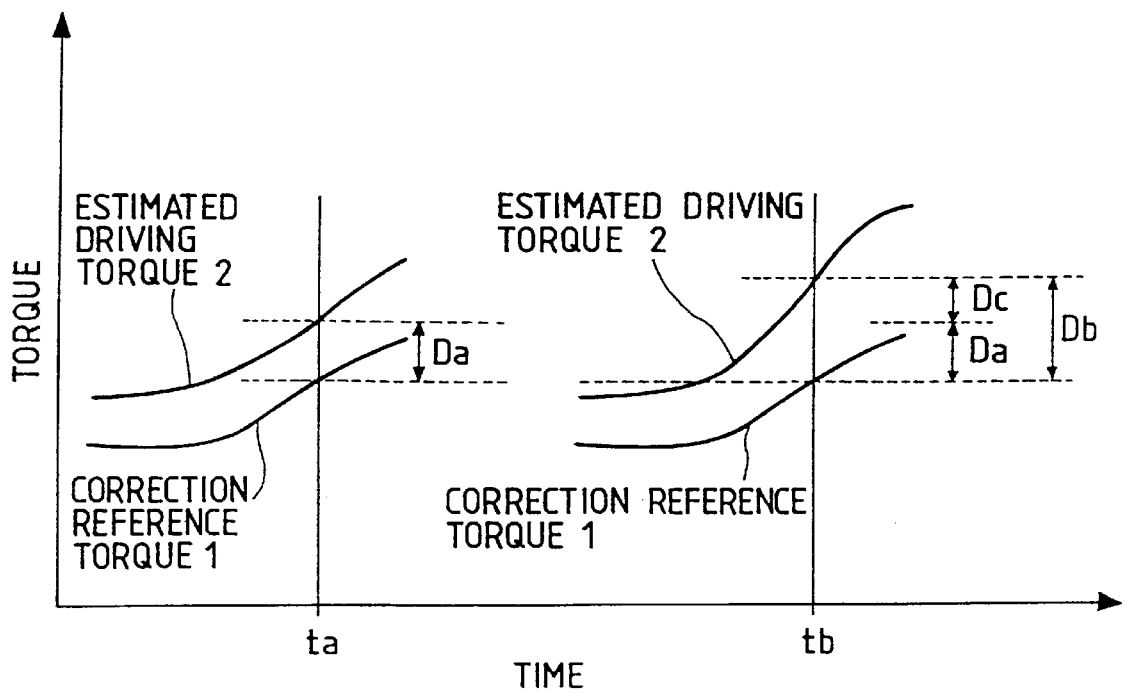
FIG. 10 is a time chart showing the basic concept of the learning and the correction of the estimated driving shaft torque.

Next, the learning correction of the estimated driving torque will be explained. FIG. 10 is a time chart showing the basic concept of the learning correction of the estimated driving torque. At a first time point ta, the deviation between the correction reference torque T1 obtained by the correction reference torque calculating means 5 and the estimated driving torque T2 obtained by the main estimated torque calculating means 6, is calculated (hereinafter, referred to as a first deviation). Then, the learning is repeated. When the correction reference torque T1 obtained by the correction reference torque calculating means 5 equals the torque T1 obtained at the first time point ta, that is, at a second time point in FIG. 10, the estimated driving shaft torque T2 is obtained again by the main estimated torque calculating means 6, and the deviation Db between the torque T1 and the torque T2 is obtained (hereinafter, referred to as a second deviation). The first deviation Da at the first time point ta is compared with the second deviation Db at the second time point tb. When the difference Dc between the deviations Da and Db become larger than a predetermined value, it is determined to start the correction, which is made by the main estimated torque calculating means 6. Thereby, the precision of the calculation of the estimated driving shaft torque T2 can be improved. Further, the abnormality of the torque converter 10 is diagnosed by monitoring whether or not the difference from the predetermined value is particularly large, or whether or not the correction is made frequently.

An example of the torque characteristics of the automatic transmission 2 has been explained hereinbefore. Now, by using the torque characteristics of the engine 1, the change of the engine 1 with the passage of time (and the abnormality of the engine 1) can be diagnosed in a way similar to that in the automatic transmission 2.

In the description with reference to FIG. 10, it is not necessary for the correction reference torque T1, the standard of the comparison actually, to equal the real driving shaft torque, but it is necessary to calculate the same value under the same condition. Namely, it is required to use the torque calculated by using parameters which deteriorate little with the passage of time as the correction reference.

Where, the correction reference torque T1 to be used is not one calculated at an arbitrary time. When the torque calculated by the correction reference torque calculating means 5 becomes equal to the correction reference torque T1 stored in advance, it is compared with the torque calculated by the main estimated torque calculating means 6 and the learning correction and the diagnosis may be made on the basis of its resultant value.

Figure 11:
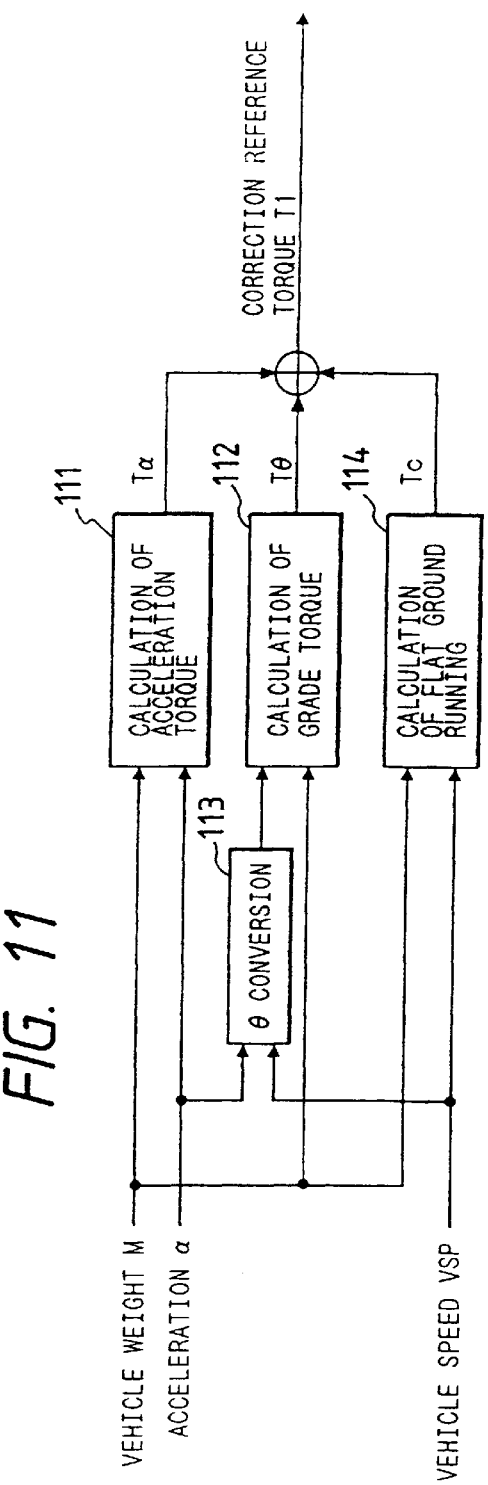
FIG. 11 is a block diagram for calculating a correction reference torque T1.

Referring now to FIGS. 11 to 23, there are shown a second embodiment of the present invention. FIG. 11 is a block diagram for calculating the correction reference 22 torque T1 by the correction reference calculating means 5 shown in FIG. 1. As described above, the total of the acceleration torque Ta, the grade torque Tθ and flat road running torque Tc is the driving shaft torque To transmitted to the wheels (see the torque calculating method using the above equation 1). The calculation 111 of the acceleration torque is carried out by using the equation 3 (below) in which the sum of vehicle total weight Wo (kg) and the weight Wr corresponding to the rotation means is multiplied by the product of the acceleration α and the radius Rw of the driving wheel. The vehicle weight M (kg) calculated by the vehicle weight detecting means 28 corresponds to the total weight Wo of the vehicle and ΔVsp can be obtained by using the differentiated value (difference) of the vehicle velocity as the acceleration. It is, therefore, possible to obtain the torque Tα.

$$T\alpha = (Wo + Wr) \cdot \Delta Vsp \cdot Rw \tag{3}$$

The calculation 112 of the grade torque is carried out by using the equation 4.

$$T\theta = Wo \cdot G \cdot \sin\theta \cdot Rw \tag{4}$$

Where, G is the acceleration detected by the acceleration detecting means 26. In the θ conversion 113, the following equation 5 is used to obtain the sin θ.

$$\sin\theta = (G - \Delta Vsp)/G \tag{5}$$

The calculation 114 of a flat ground running torque is carried out in accordance with the following equation 6 in which the torque Tc is obtained by multiplying the sum of the running resistance Fa and the rolling resistance Fr by the radius Rw of the drive wheel.

$$Tc = (Fa + Fr) \cdot Rw = (\mu a \cdot A \cdot Vsp^2 + vr \cdot Wo \cdot G) \cdot Rw \tag{6}$$

Where, $\mu a$ is a coefficient of the air resistance, A is the area projected from the front and $\mu r$ is a coefficient of the rolling resistance.

The rolling resistance Fr is generally regarded as a linear equation of the total weight of the vehicle. Further, because the running resistance Fa depends heavily on the vehicle speed Vsp and others are constant, the flat running torque Tc may be obtained by retrieving the data table using the vehicle speed, etc. as the parameters, in which the data table is made by the actually measured values obtained on the basis of the simulation or the experiment.

The correction reference torque T1 is obtained by summing the acceleration torque Tα, the grade torque Tθ and the flat ground running torque Tc. Under a certain condition, for example, when the grade torque or the acceleration torque is equal to zero, it is possible to calculate the correction reference torque T1 by using only the flat ground running torque Tc.

Figure 12:
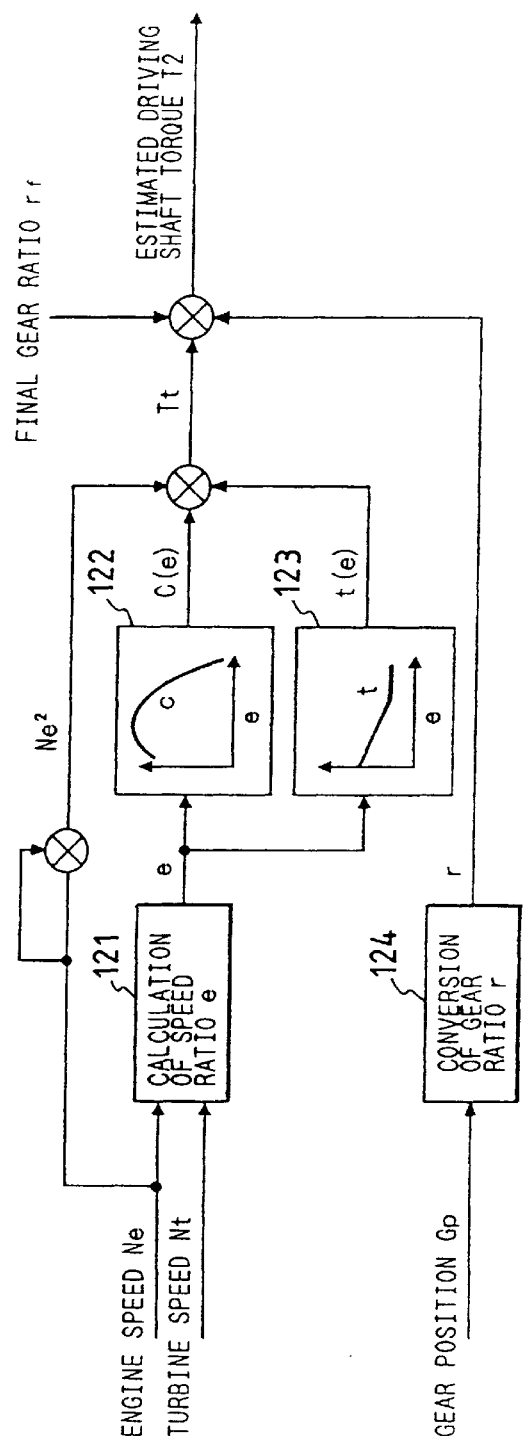
FIG. 12 is a block diagram for calculating an estimated driving shaft torque T2.

Next, FIG. 12 is a block diagram for calculating an estimated driving shaft torque T2 in the main estimated torque calculating means 6 shown in FIG. 1, in which the torque T2 utilizes the characteristics of the torque converter 10 of the automatic transmission 2. Firstly, by using the engine speed Ne and the turbine speed Nt obtained by the engine speed detecting means 13 and the turbine speed detecting means 17, respectively, speed ratio e is calculated according to the following equation 7 in block 121.

$$e = Nt/Ne \tag{7}$$

The capacitance coefficient c(e) and the torque ratio t(e) are then obtained from data tables 122 and 123 of the characteristics of the torque converter, respectively, by using the speed ratio e. By multiplying these capacitance coefficient c(e) and torque ratio t(e) by the square of the engine speed, $Ne^2$, the output torque (turbine torque) Tt of the torque converter is calculated. Finally, by multiplying the final gear ratio rf and the gear ratio r determined by using the current gear position GP in block 124 by the turbine torque Tt, the estimated driving shaft torque T2 is obtained. These relationships are represented in the following equation 8.

$$T2 = Ne^2 \cdot t(e) \cdot c(e) \cdot r \cdot rf \tag{8}$$

The estimated driving shaft torque T2 obtained by the equation 8 utilizes the characteristics of the torque converter 10. It can be, therefore, predicted that the precision of the estimate may deteriorate, because of the changes in the fluid temperature and the fluid components in the torque converter 10 with age. The change in the characteristics due to the fluid temperature is compensated by using a suitable data table, thus the precision can be maintained. However, it is difficult to predict the change in the fluid component with age. Accordingly, the learning and the correction is made by using the correction reference torque T1 and the precision of the estimate is improved. Further, the abnormality of the torque converter due to the heterogeneous fluid (ex. the oil other than the specified oil) or the breakage of blades in the torque converter is monitored and diagnosed by using the learning and the correction times. When an abnormality of the torque converter occurs, the alarm is outputted.

Figure 13:
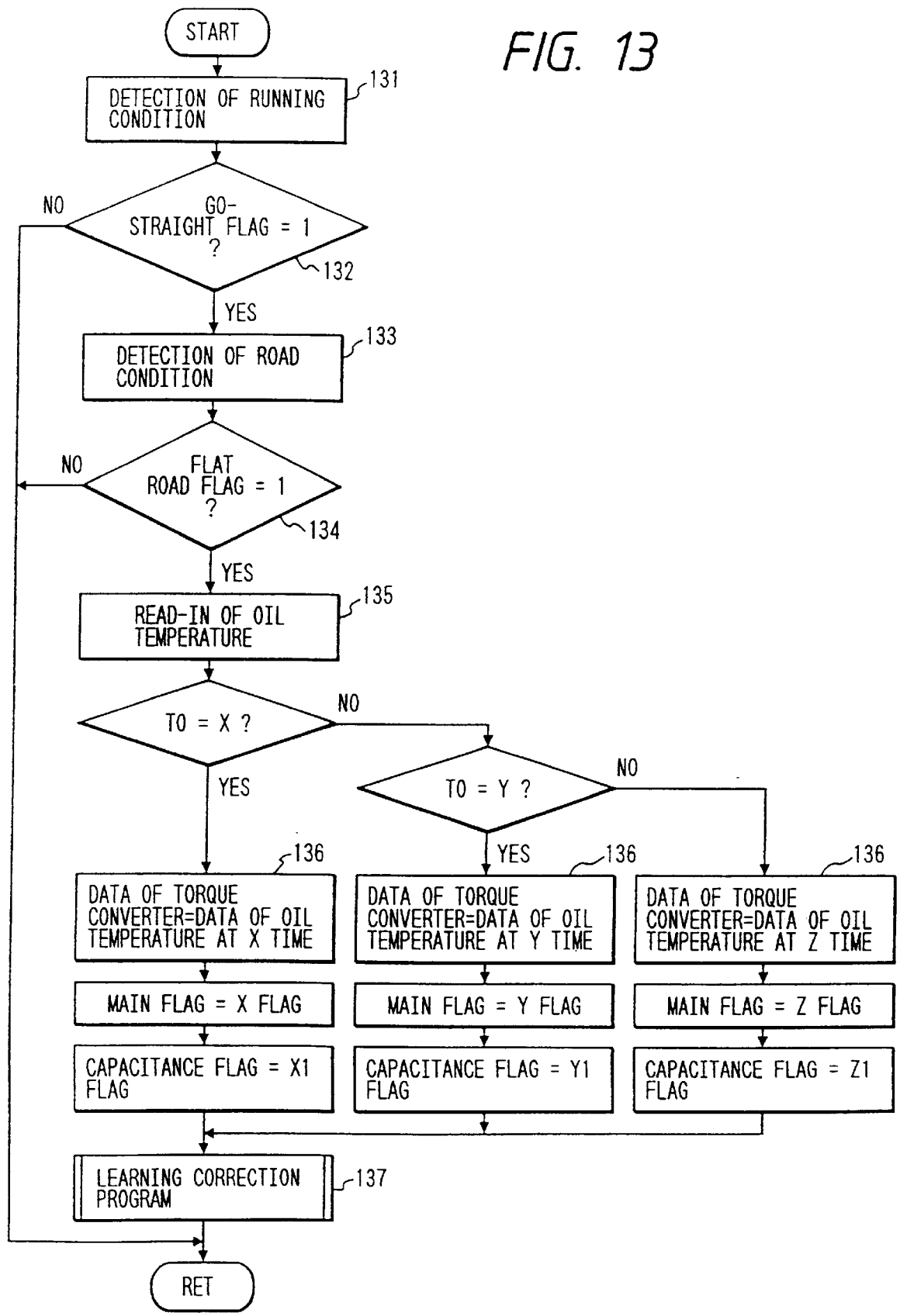
FIG. 13 is a flow chart of the learning and the correction in the torque calculating means shown in FIGS. 11 and 12.

FIG. 13 is a flow chart of the learning and the correction in the torque calculating means shown in FIGS. 11 and 12. This program can be started at a timing with time and cycle. Firstly, it is necessary to detect the running conditions at step 131. When the vehicle drives straight, the equation 1 is satisfied, which is adopted in the correction reference calculating means 5. Because a new torque component is added during the turning of the vehicle, the precision may be degraded. Therefore, the calculation of the torque is performed basically while the vehicle is in a straight drive condition. In order to detect the running conditions, if the steering angle β is equal to 0 degrees, which was obtained by the steering angle detecting means 9 shown in FIGS. 1, 3 and 4, then the straight drive flag indicative of the straight drive is set to "1". The flag is checked at step 132. If the vehicle is being turned (the straight drive flag=0), than the program is completed, and if the vehicle is being driven straight, then the processing advances to step 133. Because, as at step 131, the precision is degraded by the road conditions, the flat road flag obtained by the road condition detecting means shown in FIGS. 1 and 8 is checked at steps 133 and 134. If the flag is equal to "1", that is, the road conditions is in a stable state, then the processing advances to the next step 135, and learning is started. Because the characteristics of the torque converter changes in accordance with the temperature of the inner fluid, it is required to estimate the torque by using the characteristic data corresponding to each temperature. Even if the oil deteriorates with age and if the oil is at the temperature more than a certain constant temperature, the characteristics of the torque converter change very little, there is, therefore, no problem. If the oil temperature is equal to or less than the constant temperature, than the characteristics may change. Because the characteristics of the torque converter depend on the temperature of the inner fluid, it is required to estimate the characteristics at every temperature. At step 135, the oil temperature TO is read as a fluid temperature, and the characteristic data corresponding to the pre-stored oil temperature X, Y and Z are set as that of the torque converter. Further, a main flag and a capacitance flag which will be explained later are set, in which the main flag represents that the correction reference torque T1 has already calculated. Hereinbefore, the preparation of the start of the learning and the correction is completed, and the learning and the correction program 137 is started.

Figure 14:
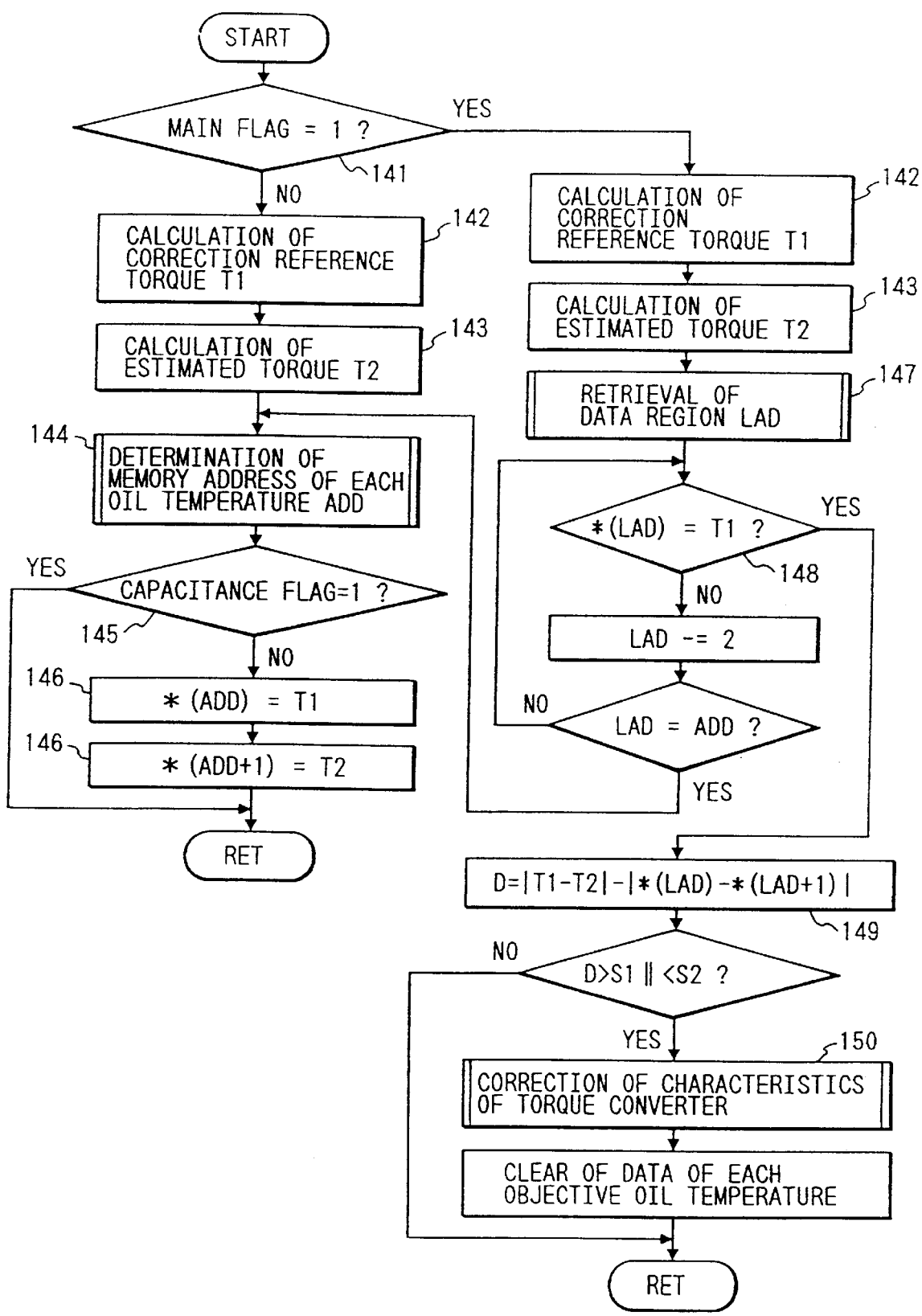
FIG. 14 is a flow chart of a learning and correcting program.

FIG. 14 is a flow chart of the learning and the correction program shown in FIG. 13. There are not one, but a plurality of the correction reference torques T1. These torques T1 are stored in a memory. At step 141, the main flag is checked, which represents that the basic correction reference torque T1 has already calculated. If the main flag=0, then the basic torque has not calculated. At steps 142 and 143, each of the torques T1 and T2 is calculated. At step 144, the memory address ADD of each of the oil temperatures is determined. When the number of the correction reference torques T1 to be stored in the memory reaches the predetermined value, whether the capacitance flag is set to "1" is checked at step 145. At step 146, the basic correction reference torque T1 and the estimated driving shaft torque T2 are stored at the addresses ADD and ADD+1 as the comparison reference data, and then the program is completed.

If the main flag=1 (in step 141), then the torques T1 and T2 are calculated at steps 142 and 143, respectively. At step 147, the memory region of the comparison reference data is retrieved and the final address LAD of the data is determined. At step 148, the data at LAD is compared with the torque T1, and then all of the stored data are compared in order with the torque T1. If all the data do not accord with the torque T1, then the processing branches to step 144. If the capacitance flag–0, then the torques T1 and T2 are stored as the comparison reference data. If the comparison reference data at the address LAD accords with the torque T1 at step 148, then two absolute differences are calculated and the relative displacement D is calculated by subtracting one absolute difference from the other absolute difference at step 149, one being the absolute difference between the comparison reference data and the data of the estimated driving shaft torque stored at the address (LAD+1) at that time, and the other being the absolute difference between the torques T1 and T2 calculated this time. If the calculated D becomes larger than the predetermined value S1 or S2, then the correction is started, and the characteristics of the torque converter are corrected at step 140. The reason why there are two predetermined value S1 and S2 is that the relative displacement may take a positive value in one case, but a negative value in another case. When the relative displacement becomes larger than either predetermined value, the correction is started. If the correction is once made, the comparison reference data at the corresponding oil temperature and the estimated driving shaft torque data are cleared and renewed in order to improve the precision.

Figure 15:
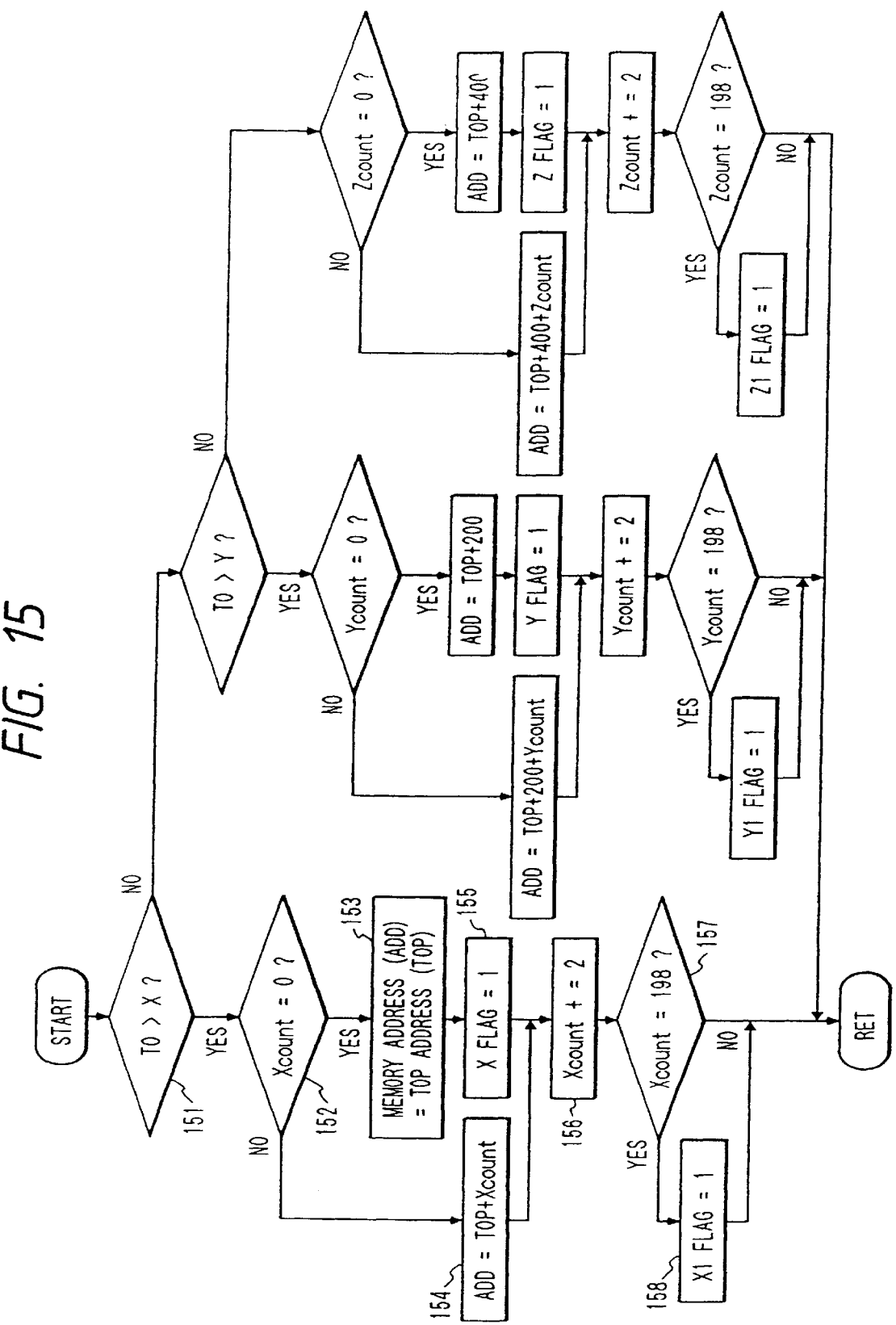
FIG. 15 is a flow chart for determining the memory address ADD every oil temperatures.

FIG. 15 is a flow chart for determining the memory address ADD of every oil temperature. The method of determining the memory address ADD for every oil temperature at step 144 shown in FIG. 14 will be explained with reference to FIG. 15. The set number of the comparison reference data is ten sets, each of which comprises a pair of T1 and T2. At step 151, the corresponding memory region is selected by using the oil temperature TO. It is assumed that the oil temperature is X. The address count Xcount is checked at step 152. If Xcount=0, the top address TOP of the memory is substituted for the address ADD (see step 153). At the same time, the X flag reflected to the main flag which represents the presence or absence of the comparison reference data is set to 1 at step 155. If the Xcount is other than 0 at step 154, the sum of TOP and Xcount is substituted to ADD. After ADD is determined, numeral 2 is added to Xcount at step 156. The number of the stored data reaches 100 sets at next time when the Xcount reaches 198 at step 157. At step 158, the X1 flag reflected to the capacitance flag is set to 1, and then the processing is completed. With regard to the oil temperatures, Y and Z, the above explanation is the same. Thus the explanation will be abbreviated.

Figure 16:
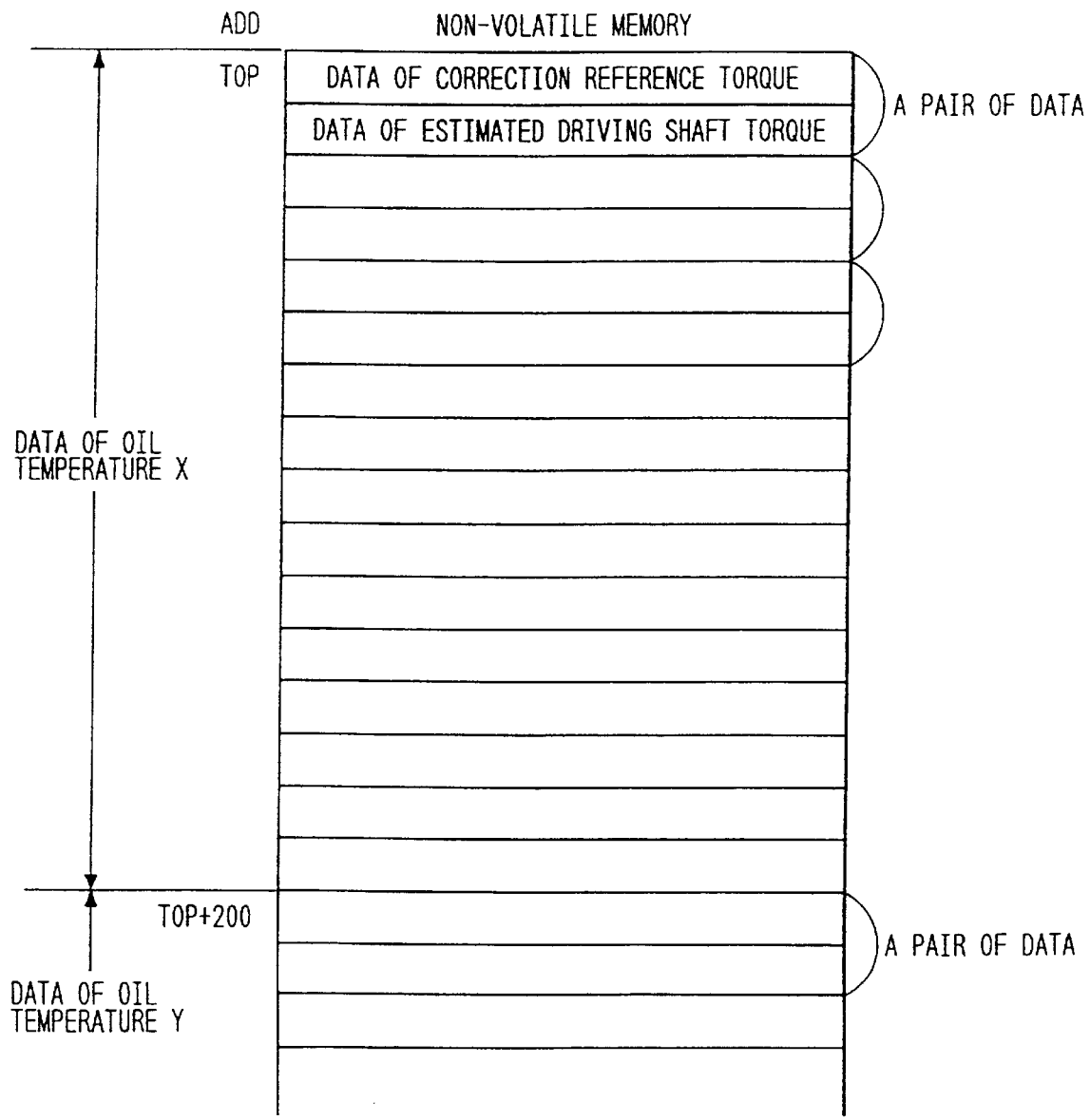
FIG. 16 is a schematic diagram showing an example of the storage form of the comparison reference data in a memory.

FIG. 16 is a schematic diagram showing an example of the storage form of the comparison reference data in a memory. By using a back-up RAM or flash memory which is non-volatile and reloadable, even if the vehicle is not continuously running (for example, the engine is not in an operating condition), it is always possible to learn and correct. The top address data ADD of a memory are stored in order from TOP at an oil temperature X, while at an oil temperature Y, the data is stored in order from the address TOP+200. Further, Xcount, X flag and X1 flag are also stored in this memory.

Figure 17:
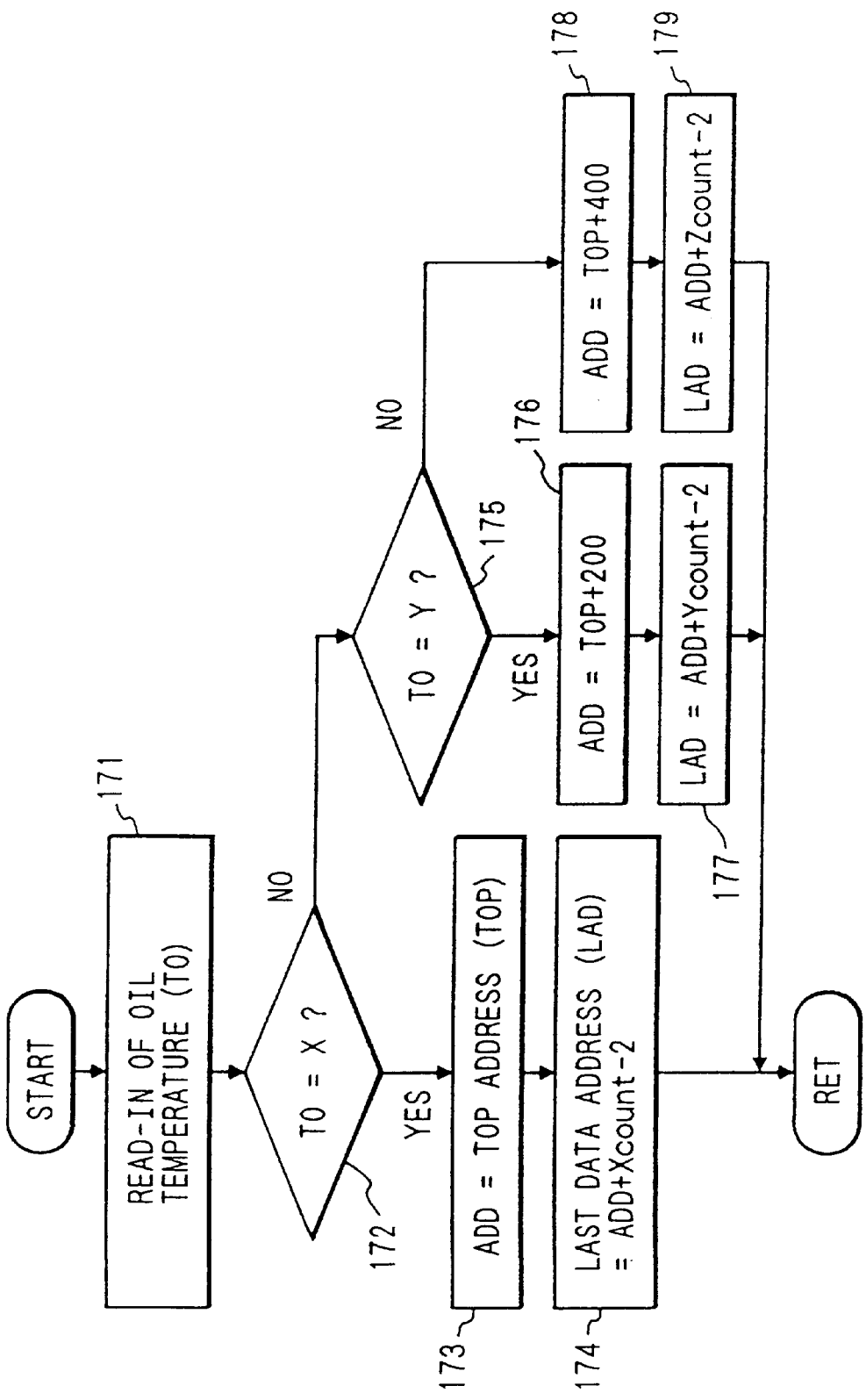
FIG. 17 is a flow chart for retrieving the final address LAD of the stored data.

FIG. 17 is a flow chart for retrieving the final address LAD of the stored data. The processing or step 147 will be explained in detail hereinafter. At step 171, the oil temperature is read, and the top address is replaced by ADD by the oil temperature T0, which exists in the region where the corresponding comparison reference data is stored every oil temperatures (steps 172 and 173). Because the Xcount, Ycount, and Zcount each has the value indicative of the next storage address, the final address LAD is obtained by subtracting 2 and adding the subtracted result to ADD.

Figure 18:
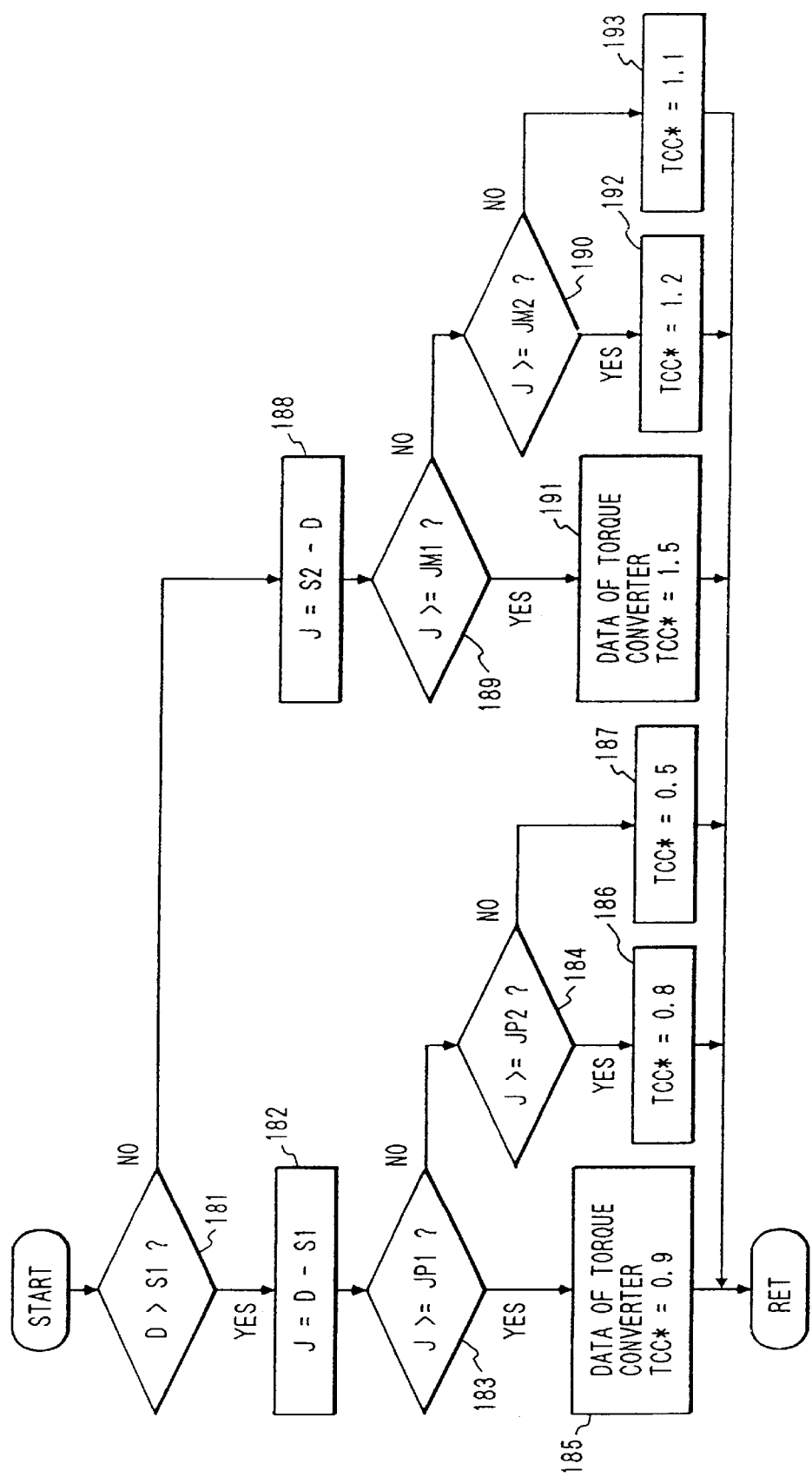
FIG. 18 is a flow chart for correcting the characteristics of the torque converter.

FIG. 18 is a flow chart for correcting the characteristics of the torque converter at step 150 shown in FIG. 14. At step 181 shown in FIG. 18, it is determined whether the D is positive or negative from the predetermined value. Next, at steps 182 and 188, the difference J between D and the predetermined values S1 and S2 is calculated, and then it is determined which reference values JP1, JP2, JM1 or JM2 (indicative of the extent of the correction) the difference J corresponds to at steps 183, 184, 189 and 190. The characteristic data TC of the torque converter is corrected in accordance with the extent of the correction at steps 185, 186, 187, 191, 192 and 193. The correction is made, for example, by multiplying it by a constant or by adding or subtracting a constant to or from it in accordance with TCC, as shown in FIG. 18.

Figure 19:
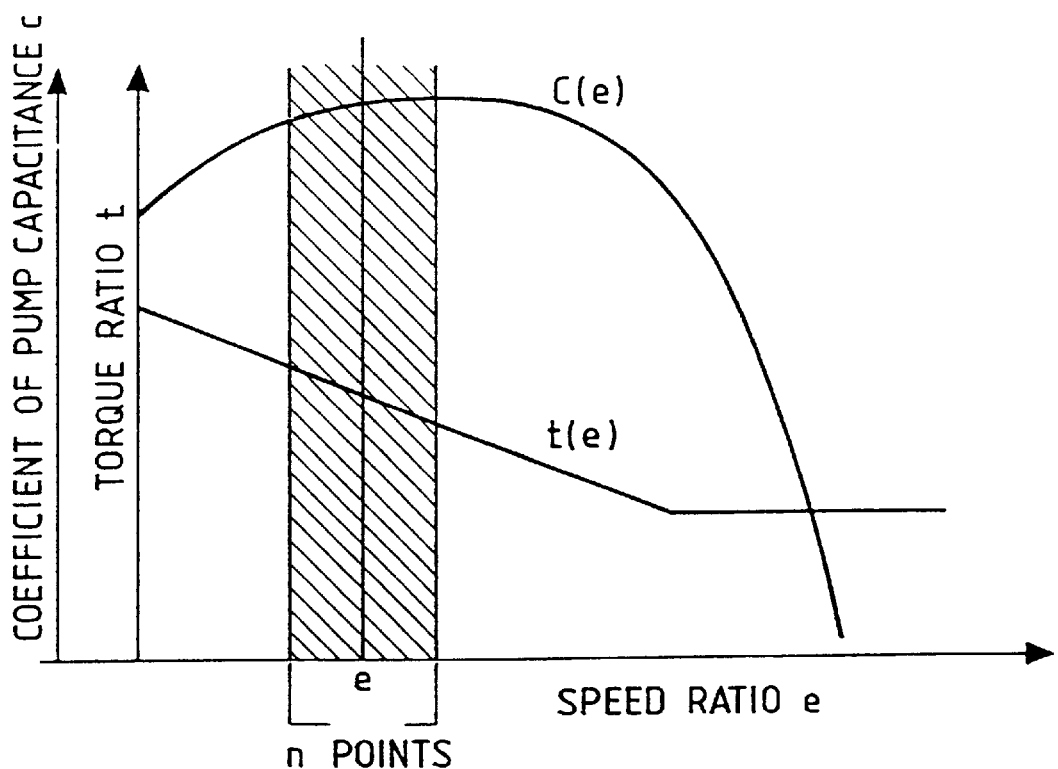
FIG. 19 is a diagram showing a partial correction of the data of the characteristics of the torque converter.

FIG. 19 is a diagram showing a partial correction of the data of the characteristics of the torque converter. It can correct not only the torque ratio t or the capacitance coefficient c of the torque converter characteristics as described above, but also the characteristic data t(e) and c(e) at n point region (hatched portion) in the neighborhood of an e point, or only at the e point by using the speed ratio e calculated by the main estimated torque detecting means 6.

Figure 20:
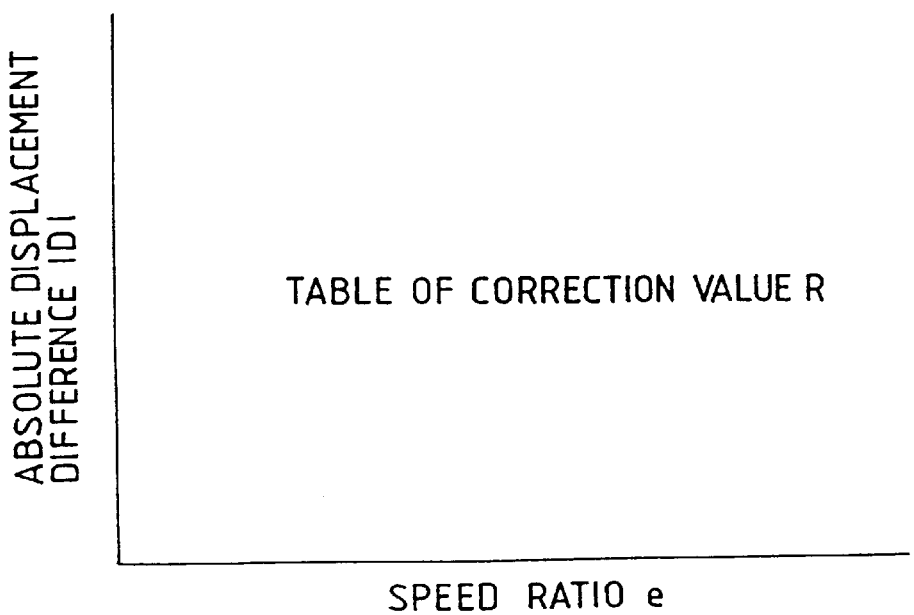
FIG. 20 is a diagram showing the concept of the data table of the correction value R for correcting partially the data of the characteristics of the torque converter.

The correction value R for partially correcting the characteristic date of the torque converter shown in FIG. 19, is obtained from the data table shown in FIG. 20. FIG. 20 is a diagram showing the concept of the data table of the correction value R for partially correcting the date of the characteristics of the torque converter. The correction value R is retrieved and corrected by using the absolute value of the relative displacement D and the speed ratio e.

Figure 21:
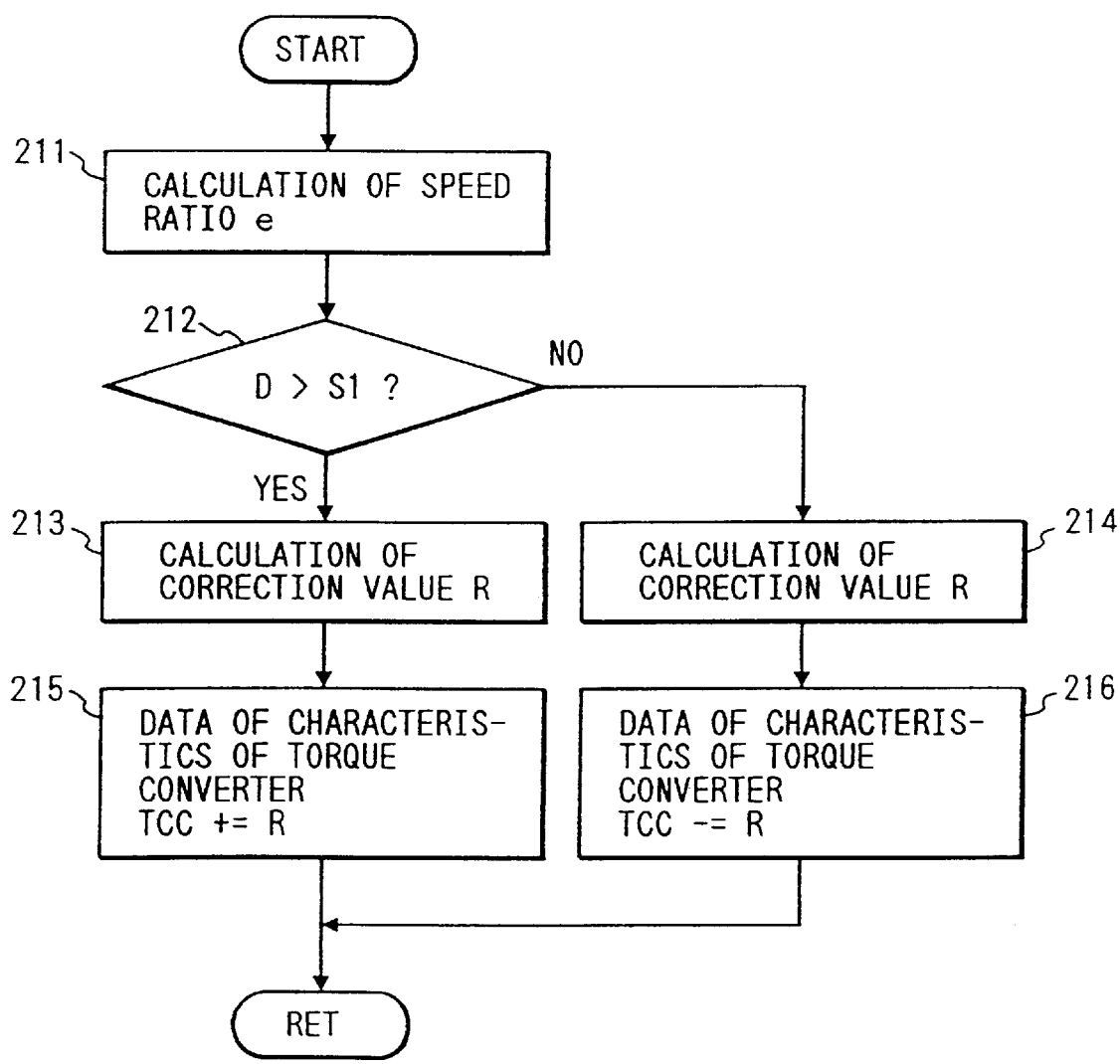
FIG. 21 is a flow chart of the correction by the correction value R.

FIG. 21 is a flow chart which shows the correction by the correction value R. After the speed ratio a is calculated at step 211, it is checked whether the relative displacement is positive or negative at step 212. And the correction value R is calculated from the data table shown in FIG. 20 at steps 213 and 214. Next, the correction is made by adding and subtracting or multiplying and dividing TCC, using the above correction value R at step 215 or 216.

Figure 22:
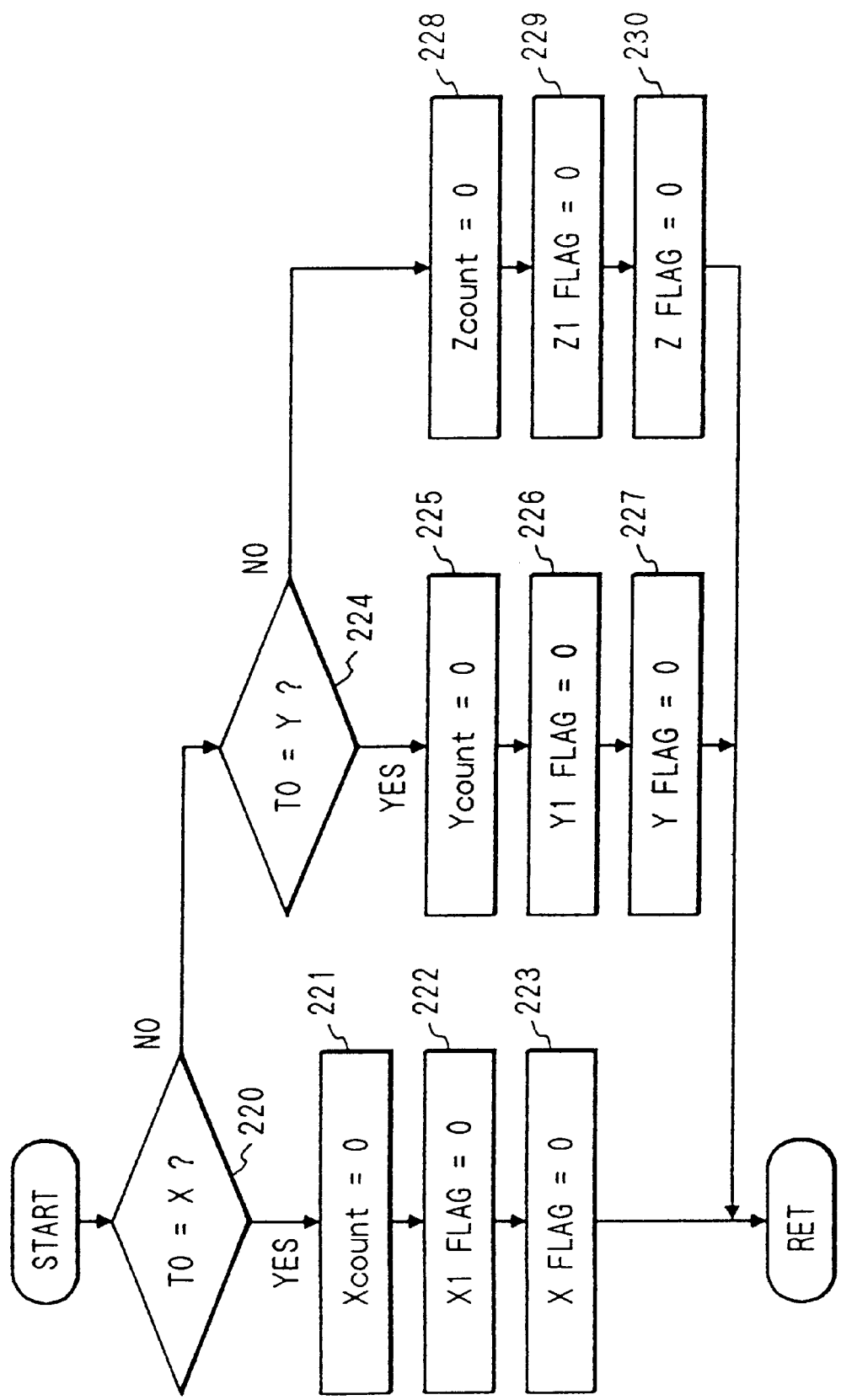
FIG. 22 is a flow chart showing the clearance of the comparison reference data every oil temperatures.

FIG. 22 is a flow chart showing the clearance of the comparison reference data of every oil temperatures. If each flag of the Xcount, X and X1 is set to 0 at steps 221, 222 and 223, the data at the corresponding oil temperature, for example, X is cleared. It is, therefore, possible to renew the existing data next time. In order to improve the precision, this processing is performed not only when the correction was made, but also when the comparison reference date did not accord with the calculated correction reference torque T1 even if the correcting program had been started 100 times. It can perform the same processing as described above, also when the data at the oil temperature Y or Z is cleared.

If an abnormality of the torque converter occurs by using a different type of oil or by breaking the blades in the torque converter, the characteristics of the torque converter changes substantially. As a result, it may be corrected frequently. However, the change of the characteristic of the torque converter caused by the changes with age such as the deterioration of the oil, occur more slowly.

Because the limit of the change with age can be predicted, the extent of the correction and the times of that at that oil temperature are known. If a correction is made which is more than the predetermined times or beyond the correction limit, an alarm indicative of an abnormality of the torque converter is outputted, in response to such the determination that the torque converter has any abnormalities other than the correction corresponding to the change with age.

Figure 23:
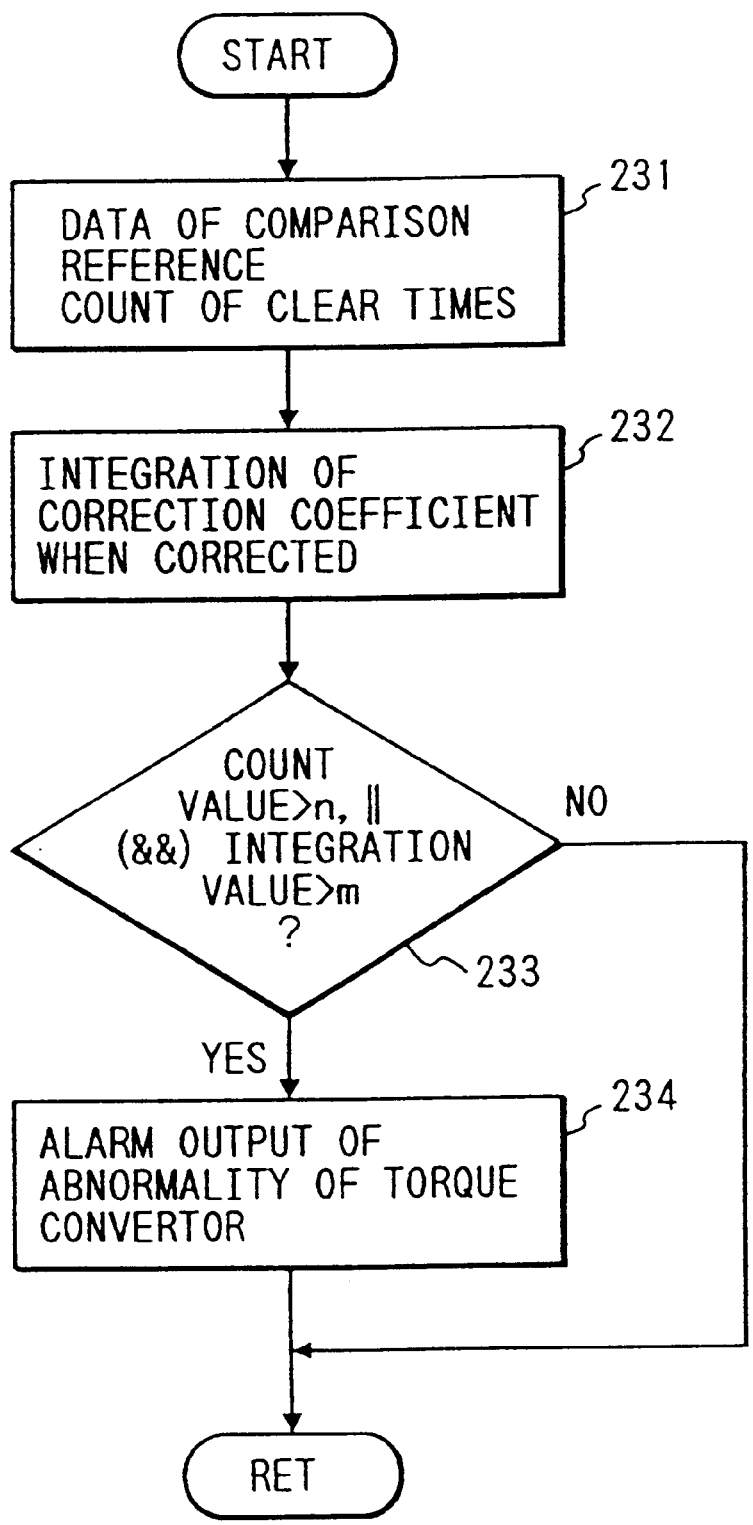
FIG. 23 is a flow chart of the diagnosis when the torque converter is abnormal.

FIG. 23 is a flow chart of the diagnosis when the torque converter is abnormal. At step 231, in order to check the number of the correction, the clearance times in each of the oil temperatures of the comparison reference data cleared every corrections is counted. At step 232, in order to check the limit of the correction, the coefficients of the corrections of the correction reference torque T1 and the estimated driving shaft torque T2 are accumulated for every oil temperature, in which the coefficient of the correction is used to correct the torques in accordance with the relative displacement. If the count value is more than the predetermined times n and/or the accumulated value becomes larger than the limited value of the correction accumulation in which the correction for the change with age can not be made more than the limited value, the occurrence of an abnormality of the torque converter is determined, and an alarm is outputted.

Figure 24:
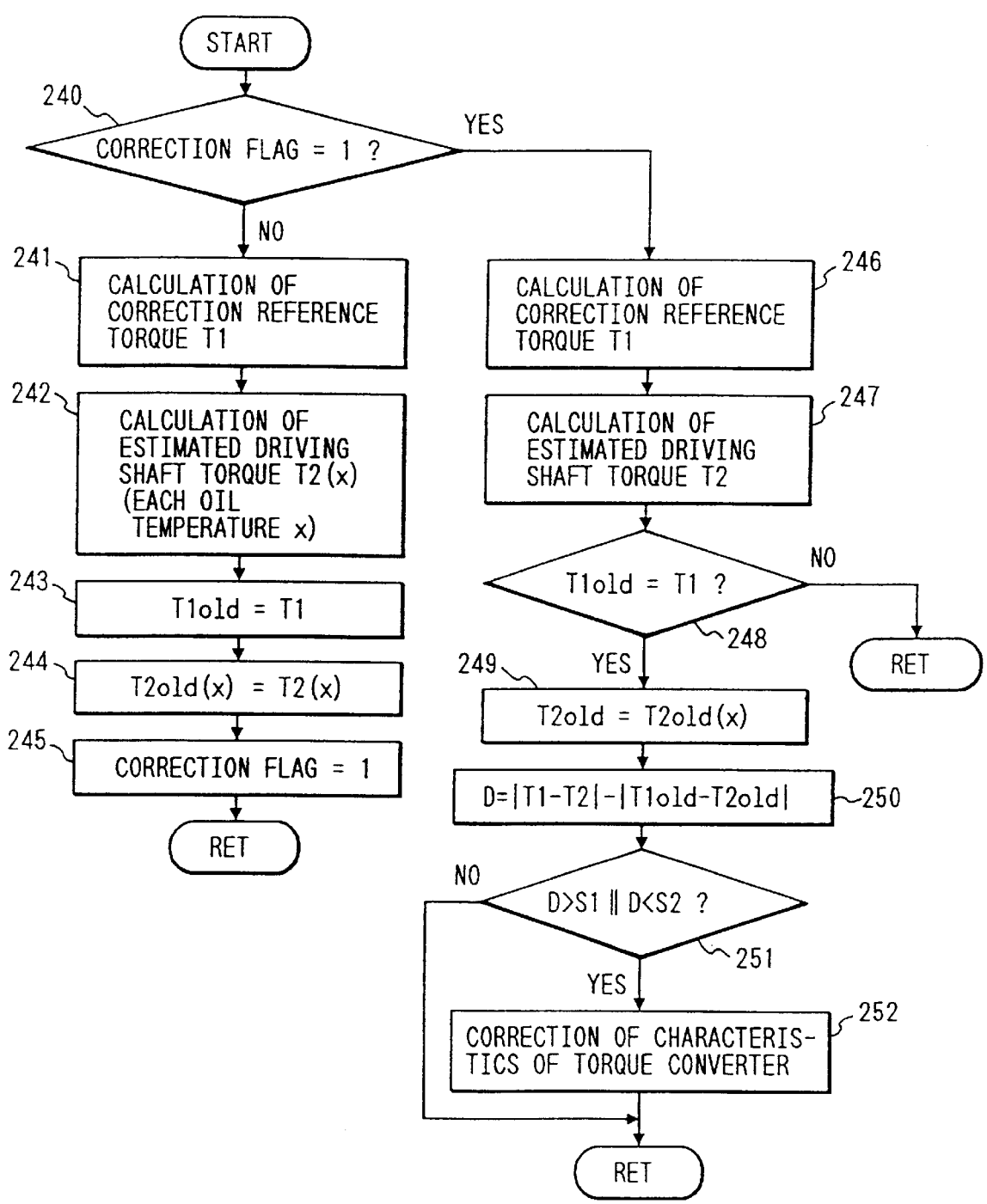
FIG. 24 is a flow chart of the learning and the correction made only during the continuous running.
Figure 25:
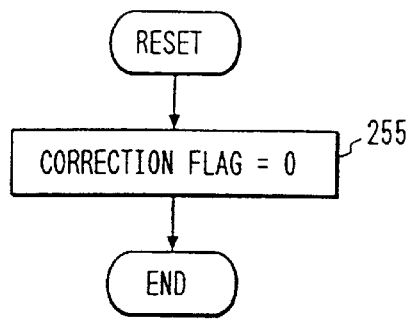
FIG. 25 is a flow chart showing the clearance of the correction flag.
Figure 26:
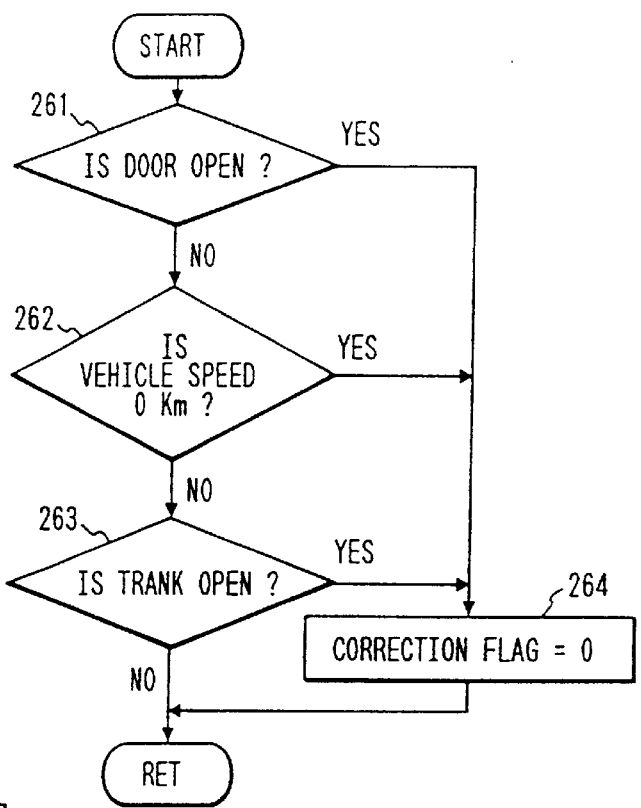
FIG. 26 is a flow chart showing the clearance of the correction flag.

FIGS. 24 to 26 show a third embodiment of the present invention. In the third embodiment, the learning and the correction are performed only during the continuous running. FIG. 24 is a flow chart of the learning and the correction performed only during the continuous running. The basic concept of the learning and the correction is the same as that of FIG. 10. At step 240, the correction flag is checked, which represents whether or not there are com-parison reference data. If the correction flag=0, then the correction reference torque T1 and the estimated driving shaft torque T2 are calculated at steps 241 and 242, respectively. At the step 242, the torques are at several temperatures by using the characteristics of the torque converter at each of those temperatures. The obtained torque T1 is substituted for the torque T1old or the comparison reference data at step 243, and the obtained torque T2(x) is substituted for the torque T2old(x) at step 244. Thereby, the comparison reference data are obtained and the correction flag is set to "1" at step 245. Thereafter, the correction flag=1 is kept while the vehicle is continuously running. When the correction program is next started, the torques T1 and T2 are calculated at steps 241 and 247, and If the torque T1old accords with the torque T1 at step 248, then the torque T2old(x) corresponding to the oil temperature at which the torque T2 is calculated in step 247, is substituted for the torque T2old. The relative displacement D is calculated at step 250, and compared with the predetermined values S1 and S2 at step 251. If the equation shown at step 251 is satisfied, then the characteristics of the torque converter are corrected. The determination of whether or not the correction is made, is performed only when a torque is produced, that accords with the torque calculated first after the correction flag became equal to 0. In such a case that it is impossible to detect the vehicle weight, the vehicle weight is regarded as a constant because the correction can be made only during the continuous running in this method. Therefore, the learning and the correction can be performed independent of the change in the vehicle weight.

FIGS. 25 and 26 are flow charts showing the clearance of the correction flag. When there is a possibility of a change in the vehicle weight, the flag is basically cleared. FIG. 25 shows a flow chart for clearing the flag in the RESET processing when the engine is stopped or re-started. The correction flag is cleared at step 255. FIG. 26 shows a flow chart for clearing the flag in such a case that a door or a tank is opened during the operation of the engine, or the vehicle speed is 0 km and the vehicle is stopped. The correction flag is cleared at step 264, because there is the possibility of the change in the vehicle weight in the above case. For example, the continuation of the vehicle speed, 0 km, is measured by a timer. When the continuation time is longer than a certain time period, the CPU assumes that the vehicle weight changed and the correction flag is cleared. While, it is assumed that the vehicle is continuously running when the correction flag–1.

Figure 27:
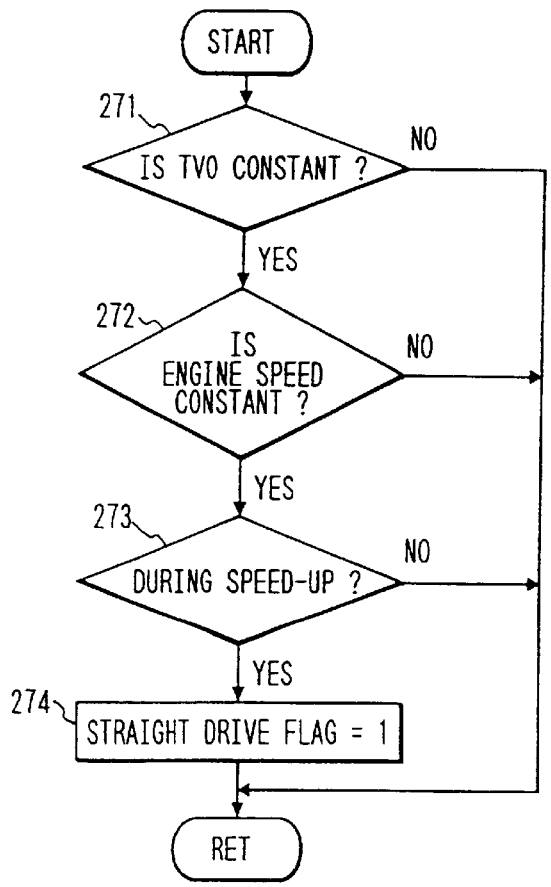
FIG. 27 is a flow chart for determining a straight drive flag without using a steering angle detecting means.

The fourth embodiment of the present invention will be next explained. This embodiment is an example of determination of whether or not the vehicle is in a straight drive. FIG. 27 is a flow chart for determining a straight drive flag without using a steering angle detecting means. It is determined whether the throttle valve opening TVO is constant at step 271, whether the engine speed is constant at step 272, and whether the vehicle speed is increasing at step 273. If all three determinations are affirmative, it is regarded that the road has no grade and the vehicle is running on a flat road. Accordingly, the straight flag is set to 1 at step 274. In this case, the correction reference torque T1 is obtained by the sum of the acceleration torque Tα and the flat road running torque Tc in accordance with the equation 1 mentioned before.

Figure 28:
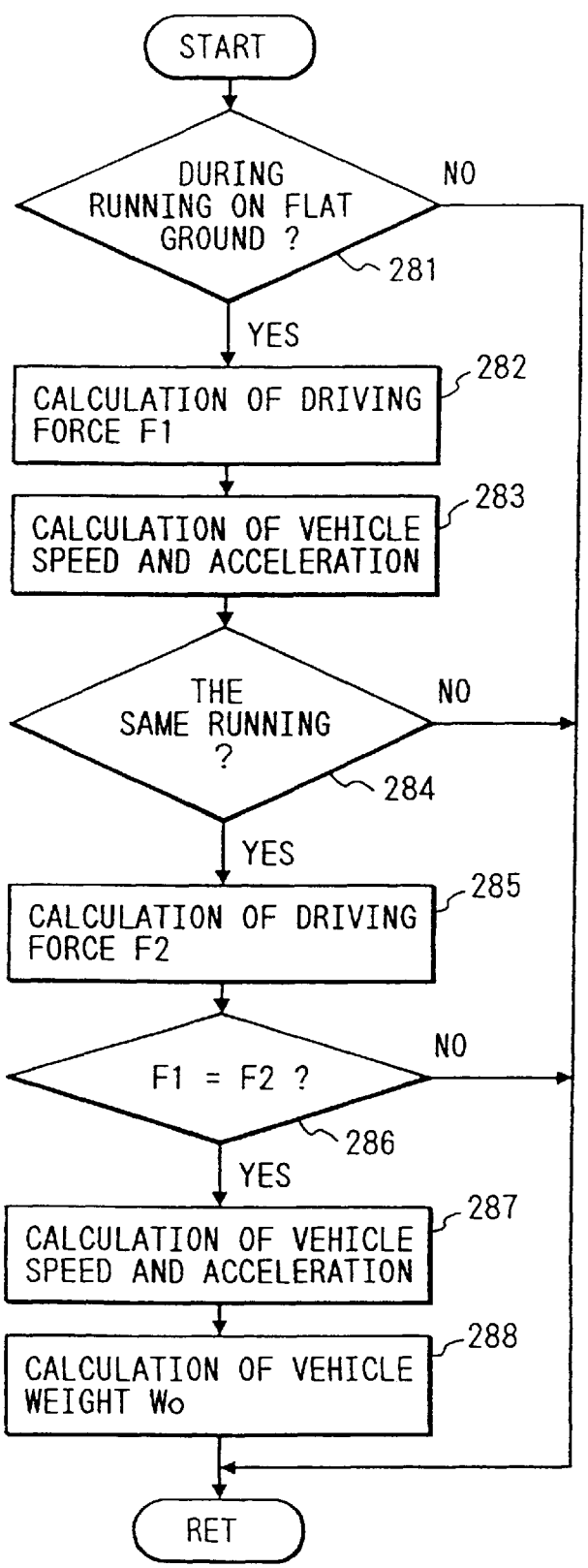
FIG. 28 is a flow chart for obtaining the vehicle weight without using a vehicle height sensor in a vehicle weight detecting means.

The fifth embodiment of the present invention will be next explained with reference to FIG. 28. This embodiment is an example of calculating the vehicle weight without using the vehicle height sensor in the vehicle weight detecting means. FIG. 28 is a flow chart of the fifth embodiment of the present invention. When the vehicle is accelerating with a constant driving force, the driving force F can be obtained by the following equation 9 from the equations 3, 4 and 6 each mentioned before.

$$F = k \cdot Vsp^2 + \mu r \cdot Wo \cdot G + Wo \cdot G \cdot \sin\theta + (Wo + Wr) \cdot \Delta Vsp \quad (9)$$

where, k is a constant including the coefficient of the air resistance, the area projected from the front of the vehicle, and so on. The driving force F is obtained by the main estimated torque calculating means, Vsp is obtained by the vehicle speed detecting means, and from the obtained Vsp, ΔVsp is obtained. Since k, Wr and $\mu r$ are inherent values, they can be preset as a constant. The vehicle weight Wo and the grade θ are unknown parameters. In order to detect the vehicle weight by using the above equation, it is assumed that during the small time ΔT within the acceleration time period, the grade is constant. At an arbitrary time T1 during the acceleration running with the same driving force F, the following equation will be satisfied.

$$F = k \cdot Vsp1^2 + \mu r \cdot Wo \cdot G + WO \cdot G \cdot \sin\theta + (Wo + Wr) \cdot \Delta Vsp1 \quad (10)$$

Further, at the time T2 after ΔT lapsed, the following equation will be satisfied.

$$F = kf \cdot Vsp2^2 + \mu r \cdot Wo \cdot G + Wo \cdot G \cdot \sin\theta + (Wo + Wr) \cdot \Delta Vsp2 \quad (11)$$

where, the driving force F is the same. By subtracting the equation 10 from the equation 11, the following equation will be obtained.

$$Wo = (Vsp2^2 - Vsp1^2) \cdot k / (\Delta Vsp1 - \Delta Vsp2) - Wr \quad (12)$$

The vehicle weight can be calculated from the above equation. That is, the vehicle weight is estimated by detecting the vehicle speed and the acceleration at different times.

In the flow chart of FIG. 28, If the grades are the same as each other, then it is assumed that the vehicle is running on the flat road. At step 281, it is determined whether or not the vehicle is running on a flat road. At step 283, the vehicle speed and the acceleration is calculated. Next, at step 284, it is checked whether or not the running after ΔT lapsed is the same as that of the last time (step 281), in which the lapse time is measured by a timer. At step 285, the driving force F2 is calculated, and it is compared with the driving force F1 at step 286. If they are the same, then the vehicle speed and the acceleration are calculated and the vehicle weight Wo is calculated by using the equation of the calculation of the vehicle weight at step 288. Because the obtained vehicle weight is constant during continuous running, this vehicle weight is used as the output of the vehicle weight detecting means.

Figure 29:
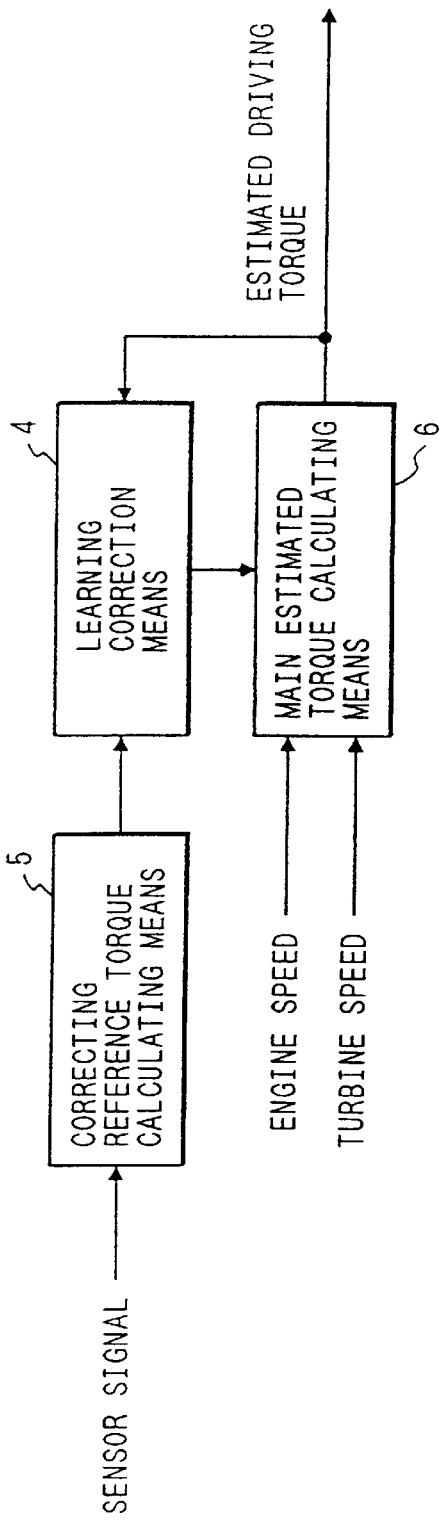
FIG. 29 is a block diagram of the learning and the correction of the torque.
Figure 30:
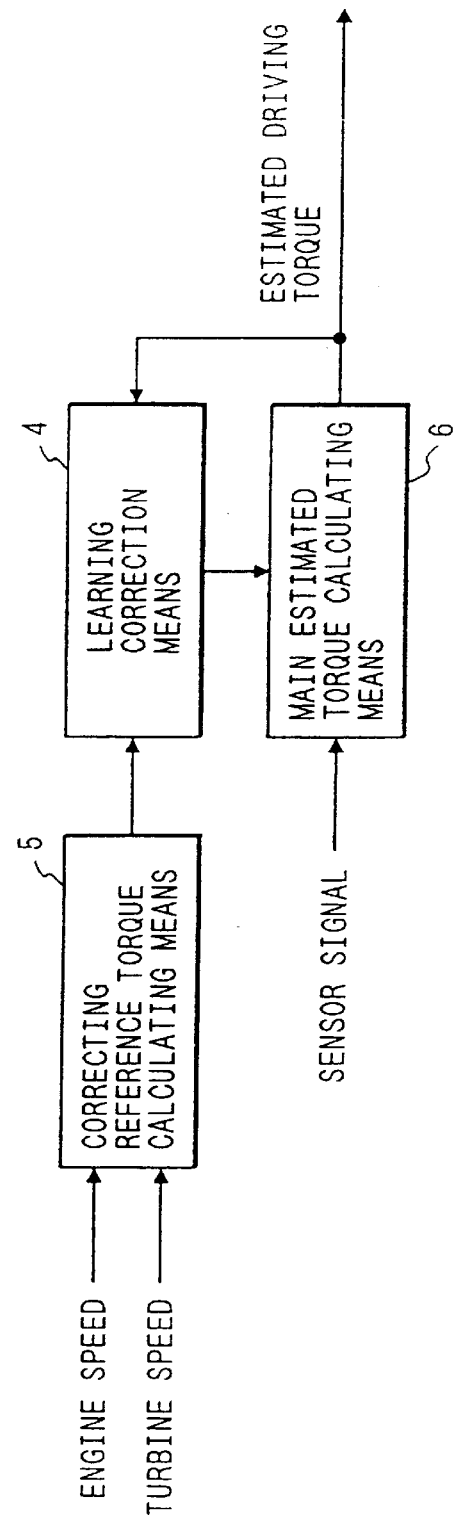
FIG. 30 is a block diagram of the learning and the correction of the torque.

Next, the sixth embodiment of the present invention will be explained. FIGS. 29 and 30 are block diagrams showing the learning and the correction of the torque. The sixth embodiment is an example of the learning and the correction of the torque performed in the vehicle control unit 3 of FIG. 1. The basic concept of the learning and the correction is as shown in FIG. 10.

FIG. 29 shows an example of the calculating method using the characteristics of the torque converter mentioned before, in which the output of the sensor such as the torque detecting means 23 is inputted into the correction reference torque calculating means 5, and the engine speed and the turbine speed are inputted into the main estimated torque calculating means 6. FIG. 30 shows another example of the calculating method using the characteristics of the torque converter mentioned before, in which the engine speed and the turbine speed are inputted into the correction reference torque calculating means 5, and the output of the sensor such as the torque detecting means 23 is inputted into the main estimated torque calculating means 6. By using either method, the estimated driving shaft torque can be obtained by performing the learning and the correction.

Figure 31:
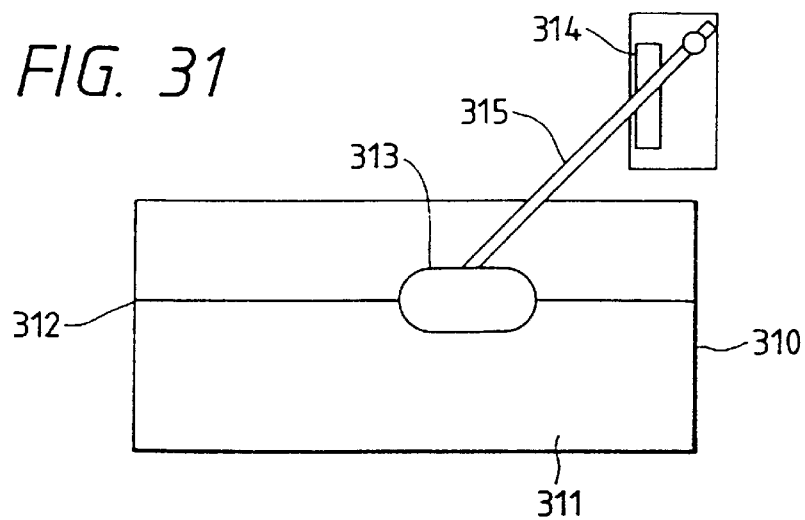
FIG. 31 is a schematic view of a residual fuel detecting method.
Figure 32:
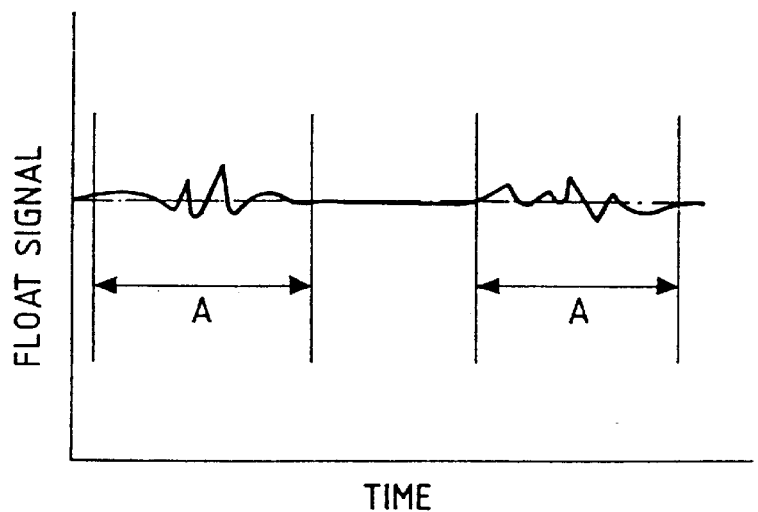
FIG. 32 is a time chart showing an example of a float signal.
Figure 33:
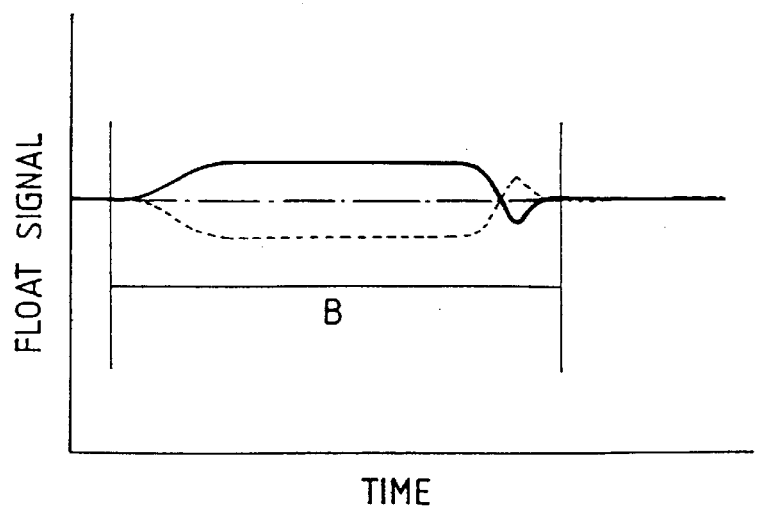
FIG. 33 is a time chart showing an example of a float signal.

FIGS. 31 to 33, show a seventh embodiment of the present invention, which utilizes the movement of a float in a fuel tank of the vehicle. FIG. 31 is a schematic view of a residual fuel detecting method used generally in the vehicle. A float 313 which is provided slidably in a fuel tank 310, floats on a liquid surface 313 of the fuel in the fuel tank. The position signal corresponding to the residual fuel is detected by a resistance plate 314 and an arm 315 connected to the float 313. By inputting the position signal into the road condition detecting means, the conditions of the road surface can be detected.

FIG. 33 is a time chart showing an example of a float signal, in which the alternate long and short dash line designates the normal liquid surface signal, and the signals are designated as at a solid line and a dotted line, respectively, when the vehicle is running on the up-slope and the down-slope. Accordingly, it can be determined whether the vehicle is on the up-slope or down-slope by comparing the detected signal with the normal liquid surface signal.

Figure 34:
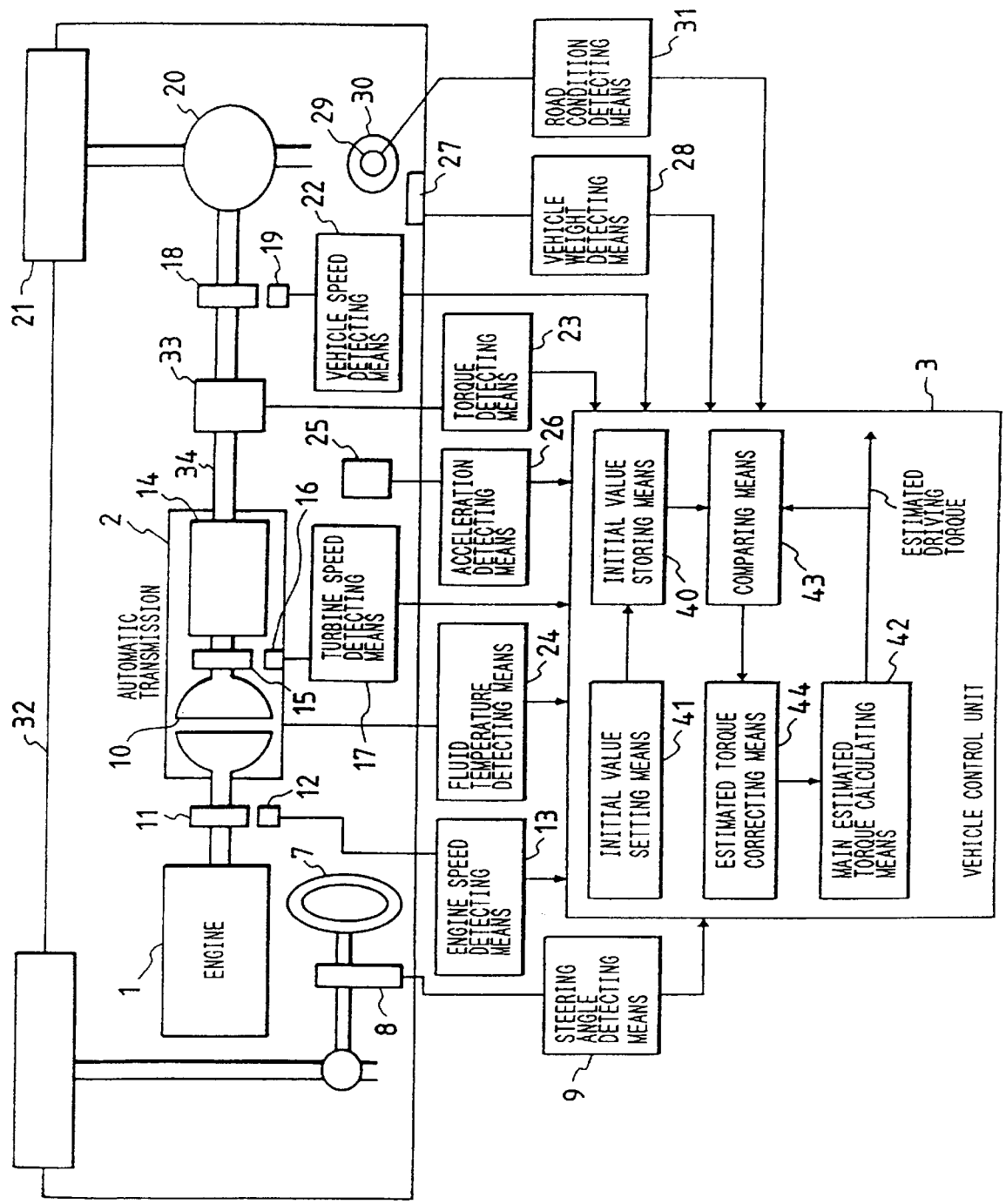
FIG. 34 is a schematic view of the whole control apparatus.

FIGS. 34 to 41 show an eighth embodiment of the present invention. FIG. 34 is a schematic view of the whole control apparatus. In FIG. 34, the vehicle control unit 3 is provided with an initial value storing means 40 for storing the initial value used in order to determine the differences between the actual driving shaft torque and the estimated driving shaft torque, for example, caused by the difference between engines. The vehicle control unit 3 further includes an initial value setting means 41 to set the initial value for determining the change with age and renew the initial value of the initial value storing means 40. The vehicle control unit 3 further includes a main estimated torque calculating means 42 for estimating the torque and calculating the estimated driving shaft torque, a comparing means 43 for comparing the estimated driving shaft torque with the initial value in order to determine the difference between the engines and the change with age, and an estimated torque correcting means 44 for correcting the estimated driving shaft torque in accordance with an output of the comparing means 43.

Figure 35:
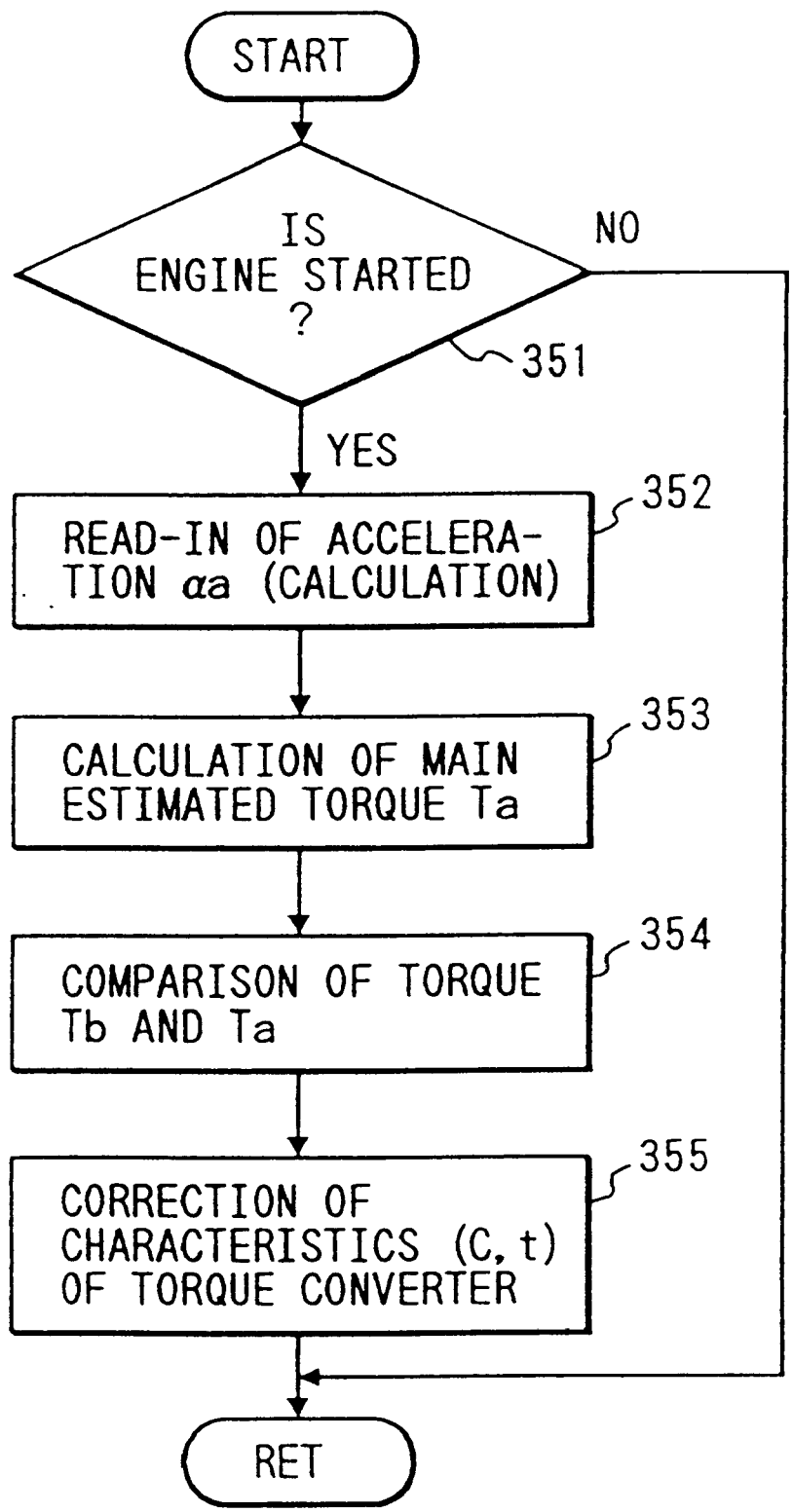
FIG. 35 is a flow chart for correcting the driving shaft torque error between engines.

The example for calculating the estimated driving shaft torque will be explained hereinafter, in which the characteristics of the torque converter are used in the main estimated torque calculating means 42. The initial value to the torque correction is set when the vehicle runs at first after the completion of assembly. FIG. 35 is a flow chart for correcting the driving shaft torque error between the engines. Firstly, the acceleration αa is read when the vehicle begins to run after the start of the engine. Secondly, the main estimated torque Ta is calculated from the current characteristics of the torque converter by using the main estimated torque calculating means 42 at step 353. At step 354, the torque Ta is compared with the reference torque Tb(αa) at the acceleration αa, the initial value stored in the initial value storing means 40, and the effect of the difference between the engines is estimated. At step 355, in order that the torque Ta becomes the torque Tb of the data of the initial value, the capacitance coefficient C and the torque ratio t, the characteristics of the torque converter, are corrected. The initial characteristics of the torque converter are replaced by the corrected value.

Figure 36:
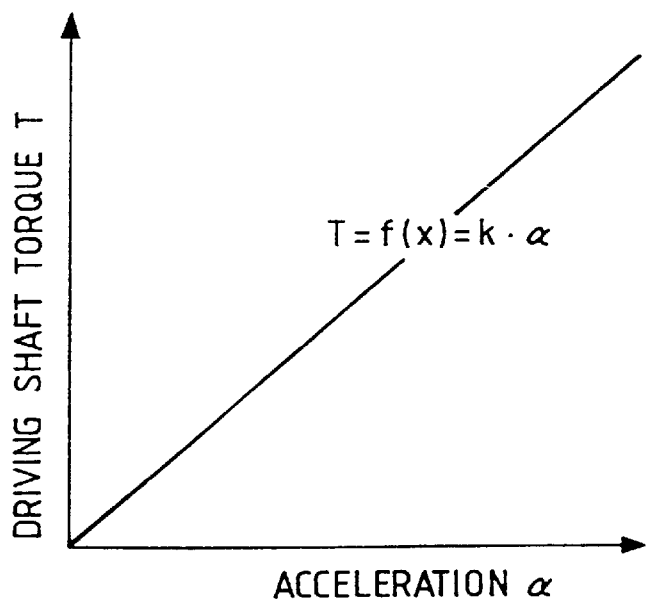
FIG. 36 is a diagram showing the relationship between the acceleration and the driving shaft torque when the vehicle is running on the flat road.

The initial data will be explained next, which is pre-stored in the initial value storing means 40 and compared with the estimated driving shaft torque Ta calculated by the main estimated torque calculating means 42. FIG. 36 is a diagram showing the relationship between the acceleration and the driving shaft torque when the vehicle is running on the flat road. When the vehicle weight is constant and the vehicle is running on the flat road, the proportional characteristics or a functional equation T=f(x) is satisfied between the acceleration α and the driving shaft torque T, where, k is a running resistance of the vehicle, which is such a constant that depends on the rolling resistance and the vehicle weight are taken into consideration. As described above, the torque correction for the difference between the engines is made while a new vehicle runs on the flat road. Therefore, the characteristics obtained according to the above equation are used. However, even when the initial running is on the slope, it can be used by changing the constant k to a value which takes into consideration the degree of the grade. The absolute value of the driving shaft torque obtained from the acceleration is stored in the data table, or the above functional equation is stored in the initial value storing means 40.

Figure 37:
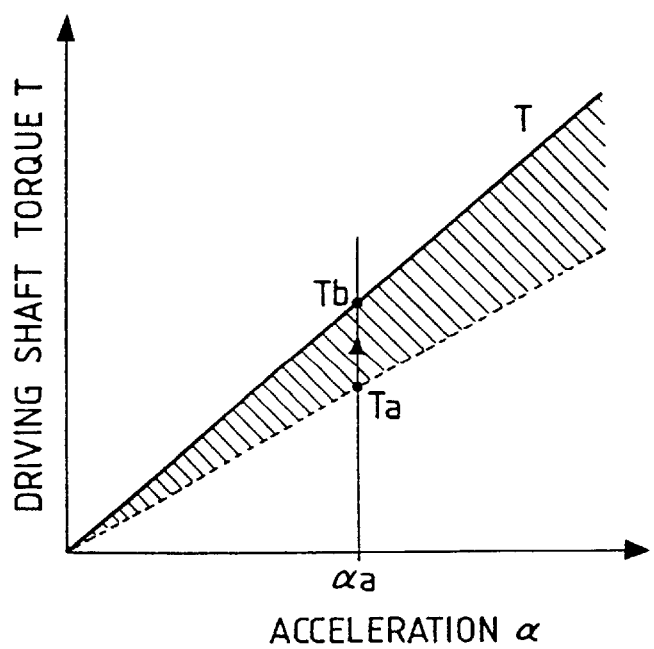
FIG. 37 is a diagram showing the relationship between the acceleration and the driving shaft torque, and showing a method of detecting the torque error between the engines.

FIG. 37 is a illustrates the relationship between the acceleration and the driving shaft torque, and shows a method of detecting the torque error between the engines in the comparing means 43. The characteristics of the estimated driving shaft torque designated by a dotted line is determined by inputting the estimated driving shaft torque Ta estimated when the acceleration is an αa. The solid line designates the characteristics of the initial value of the driving shaft torque T obtained from the reference driving shaft torque Tb when the acceleration is an αa. The capacitance coefficient C and the torque ratio t of the torque converter is corrected in such a way that the torque Ta becomes equal to the torque Tb by taking the torque errors into consideration, in which the torque errors are represented by the hatched region, in other words, in such a way that the dotted line and the solid line may be overlapped.

Figure 38:
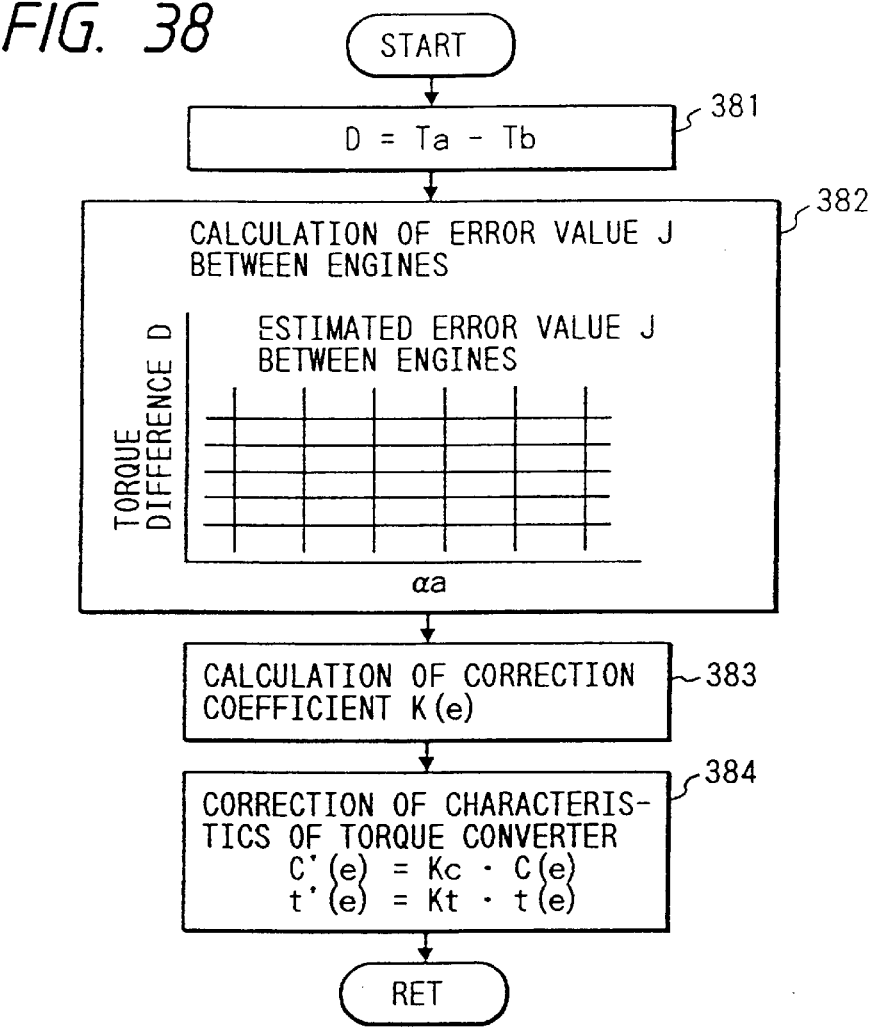
FIG. 38 is a flow chart showing the correction by an estimated torque correction means.
Figure 39:
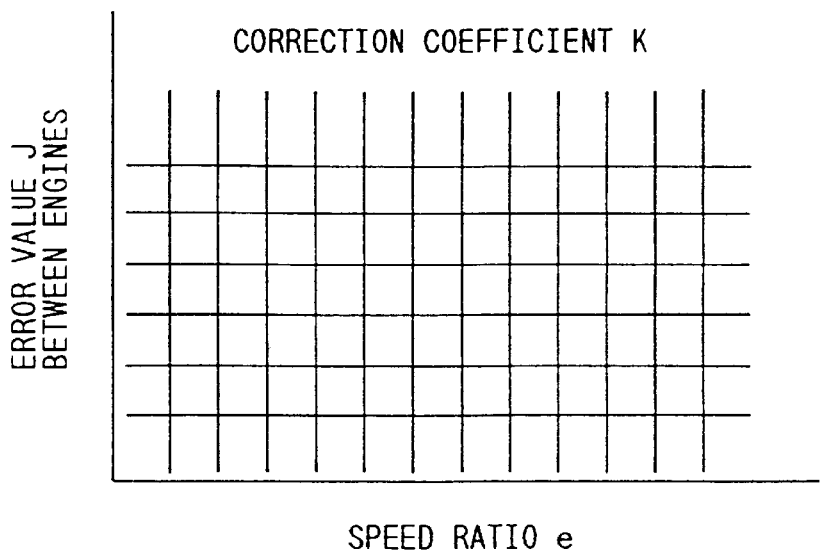
FIG. 39 is a schematic diagram showing an example of the data table of a correction coefficient K.

FIG. 38 is a flow chart showing the correction by the estimated torque correction means 44. At processing 381, the torque difference D between the estimated driving shaft torque Ta and the reference driving shaft torque Tb is obtained. The estimated errors between the engines by the torque difference D and the acceleration aa is stored as a data table. At processing 382, the error value J is obtained by using the data table. At processing 383, the correction coefficients Kc and Kt is calculated from the error value J, and a new curve of the characteristics C' and t' which take into consideration the errors between the engines, is made by multiplying each of the characteristics of the torque converter by K. The individual torque converters have the inherent characteristics, respectively. However, the errors between the engines made when the vehicles are produced, can be limited within the range of a predetermined upper limit and a lower limit by production management. Accordingly, the correction coefficient K may be stored in the initial value storing means 40 as the data or functional equation in which the upper and the lower limits are considered. As shown at step 384 of FIG. 38, it is possible to correct equally the whole region of the characteristics of the torque converter by using the correction coefficient. The method improved in the precision will be explained hereinafter.

The value of the capacitance coefficient C to the speed ratio e of the torque converter suddenly approaches in the coupling region after passing through the clutch point, and the torque ratio t of the torque converter becomes nearly equal to "1". It is possible not only to correct equally by using the data table of the correction coefficient K, but also to correct by obtaining the correction coefficient K corresponding to the speed ratio e. It is also possible not only to correct on the basis of the pre-stored characteristics of the torque converter, but also to correct by storing the characteristic data in which the errors between the engines are considered, and selecting the characteristic data corresponding to the errors J.

The correction mentioned above is made when a new vehicle first run. Therefore, the temperature of the fluid is lower, thus the stored characteristics of the torque converter are those at low temperatures. In order to take the fluid temperature into consideration, the characteristics of the torque converter at the different temperatures are stored, and that corresponding to the fluid temperature during the running is selected by the fluid temperature detecting means 24 shown in FIG. 1. the estimated driving shaft torque Ta in the main estimated torque calculating means 42 or the characteristics of the torque converter in which the errors between the engines are considered, can be obtained on the basis of the above selected characteristics. The data table corresponding to the above fluid temperature or the functional equation can be used for the correction coefficient K.

Figure 40:
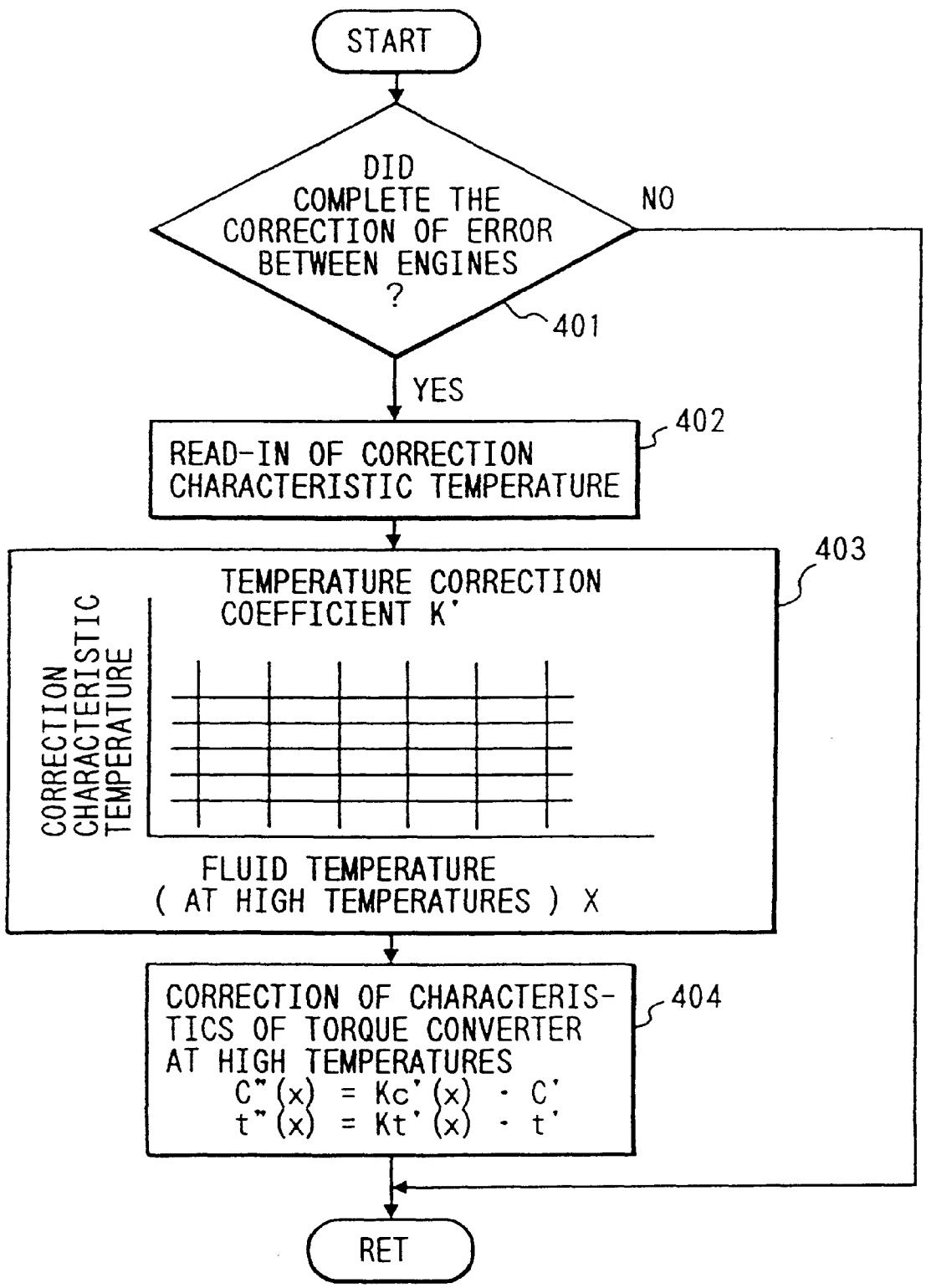
FIG. 40 is a flow chart for correcting the characteristics of the torque converter at high fluid temperatures.

The correction of the characteristics of the torque converter at high temperatures made by the estimated torque correction means 44 will now be explained. Because the characteristics of the torque converter change largely in accordance with the increase of the temperature of the inside fluid, it is required to store the characteristics of the torque converter corresponding to the temperatures from high temperatures to low temperatures, or to store the functional equation for obtaining the characteristics of the torque converter in the different temperatures by calculating on the basis of the characteristics of the torque converter at a certain temperature. Anyway, it is required to correct the errors between the engines at each temperature. FIG. 40 is a flow chart for correcting the characteristics of the torque converter at high fluid temperatures. At step 401, it is checked whether or not the correction of the errors between the engines has been completed. After the completion, the correction characteristic temperature is read, which is the fluid temperature corresponding to the newly corrected characteristics of the torque converter at low temperatures. The data table of the temperature correction coefficient K' or the functional equation obtained from the fluid temperature X (at high temperatures) and the correction characteristic temperature (at low temperature), is predetermined by the estimation and the calculation. By using it, the temperature correction coefficient K'(x) is calculated from the fluid temperature X of the torque converter to be corrected and the correction characteristic temperature. K'(x) is calculated on each of the characteristics of the torque converter at high temperatures. At step 324, the capacitance coefficient C" and the torque ratio t" are obtained by multiplying the characteristics C' and t' of the torque converter by K'c(X) and K't(X), respectively, and the characteristics of the torque converter corresponding to the high temperature are corrected.

Figure 41:
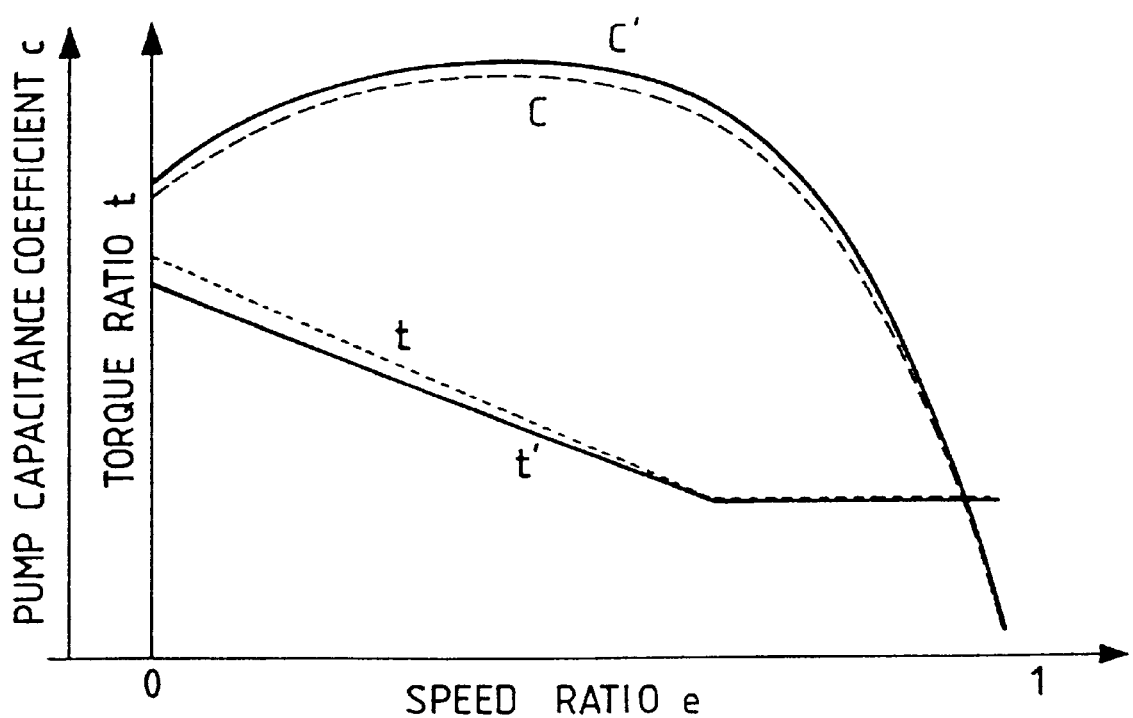
FIG. 41 is a diagram showing the characteristics of the corrected torque converter in which the error between the engines is considered.

FIG. 41 is a diagram showing the characteristics of the corrected torque converter in which the error between the engines is considered. In FIG. 41, the dotted line designates the capacitance coefficient C and the torque ratio t of the torque converter at low temperatures, and the solid line designates capacitance coefficient C' and the torque ratio t' of the torque converter corrected in consideration of the errors between the engines. In addition, the characteristics at high temperature is also corrected in the above method. As a result, it is possible to obtain the initial characteristics of the torque converter at different fluid temperatures.

As described above, it is possible to obtain the estimated driving shaft torque by taking the errors between the torque converters into consideration, and thus estimate highly precisely the driving shaft torque. It is possible to use the precise driving shaft torque estimated by correcting the errors between the torque converters in any controls in which the driving shaft torque is used as a control parameter, such as a torque feedback control, a transmission and a oil pressure control, a grade estimating control, a map-less transmission control, an engine torque control, lean burn control, overload preventing control, and a creep force control during the warm-up operation.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. A control apparatus for a powertrain of a vehicle including a drive unit having a motor, an automatic transmission with a torque converter, and a drive shaft, comprising:
   a first torque estimating means for estimating a first drive shaft torque by means of a first drive shaft torque determining method which uses characteristics of the torque converter, and for outputting a signal representing an estimated first drive shaft torque so as to use the same for the control of the powertrain;
   a second torque estimating means for estimating a second drive shaft torque based on a second drive shaft torque determining method which is different from the first drive shaft torque determining method, estimated second drive shaft torque being used as a reference for the estimated first driving shaft torque; and
   a learning and correcting means for learning and comparing the estimated first drive shaft torque with the estimated second driving shaft torque, and for correcting the characteristics of the torque converter used in said first torque estimating means based on the learning and comparison, whereby signals representing corrected estimated first driving shaft torques are output thereafter;
   wherein said learning and correcting means
   determines a first deviation between the estimated first drive shaft torque and the estimated second drive shaft torque each obtained at a first time point;
   determines a second deviation between the estimated first drive shaft torque and the estimated second drive shaft torque each obtained at a second time point when a value of the estimated second drive shaft torque becomes equal to the value estimated at the first time point;
   determines a start of correction when the difference between the first deviation and the second deviation becomes larger than a predetermined value; and
   performs a correction of the characteristics of the torque converter.

2. A control apparatus for a powertrain of a vehicle according to claim 1, wherein said second torque estimating means comprises a torque sensor mounted on said driving shaft.

3. A control apparatus for a powertrain of a vehicle according to claim 1, wherein said second torque estimating means estimates the second driving shaft torque by using signals detected from a vehicle weight detecting means and an acceleration detecting means.

4. A control apparatus for a powertrain of a vehicle according to claim 3, wherein said second torque estimating means estimates a change in the vehicle weight by measuring when the vehicle speed is continuously equal to zero for a predetermined time period, and re-estimates the second drive shaft torque based on a newly detected signal from said vehicle weight detecting means.

5. A control apparatus for a powertrain of a vehicle according to claim 3, wherein said vehicle weight detecting means determines the vehicle weight through calculation by using a first speed and a first acceleration detected at a first time point, and a second speed and a second acceleration detected at a second time point.

6. A control apparatus for a powertrain of a vehicle according to claim 1 wherein said learning and correcting means receives at least one of a steering angle signal from a steering angle detecting means and a road condition detection signal from a road condition detecting means, and determines whether or not the learning and correcting operation thereof will be continued based on the received signals.

7. A control apparatus for a powertrain of a vehicle according to claim 6, wherein a float signal for detecting residual fuel in a fuel tank is used as the road condition detection signal.

8. A control apparatus for a powertrain of a vehicle according to claim 1, wherein the learning and correcting means generates an abnormality detecting signal and outputs the same when a number of times that the characteristics of the torque converter is corrected exceeds a predetermined number, or an accumulated correction for the characteristics of the torque converter exceeds a predetermined amount.

9. A control apparatus for a powertrain of a vehicle including a drive unit having a motor, an automatic transmission with a torque converter, and a drive shaft comprising:
   a first torque estimating means for estimating a first drive shaft torque by means of a first drive shaft torque determining method which uses initial inherent characteristics of the torque converter, and for outputting a signal representing an estimated first drive shaft torque so as to use the same for the control of the powertrain;
   an initial value storing means for storing a relationship between an acceleration of the vehicle and a second driving shaft torque output by said drive unit as initial values;
   a unit which compares the signal representing the estimated first driving shaft torque with a signal representing an initially stored second driving shaft torque and modifies the initial characteristics of the torque converter based on the comparison result, whereby signals representing corrected estimated first drive shaft torques are output thereafter based on modified characteristics of the torque converter;
   a correction completion detecting means for detecting completion of correction of the initial characteristics of the torque converter; and
   an inhibition means for inhibiting application of the signal representing the estimated first drive shaft torque outputted from said first torque estimating means for control of the powertrain if correction completion is not detected.

10. A control method for a powertrain of a vehicle including a drive unit having a motor, an automatic transmission with a torque converter, and a drive shaft comprising:

estimating a first drive shaft torque using a first drive shaft torque determining method based on characteristics of the torque converter, and outputting a signal representing the estimated first drive shaft torque so as to use the same for the control of the powertrain;

estimating a second drive shaft torque using a second drive shaft torque determining method which is different from the first drive shaft torque determining method, the estimated second drive shaft torque being used as a reference for the estimated first drive shaft torque; and learning and comparing the estimated first drive shaft torque with the estimated second drive shaft torque and correcting characteristics of the torque converter used in the first torque estimating method based on the learning and comparison, whereby signals representing corrected estimated first drive shaft torques are output thereafter;

wherein said learning and correcting step includes.

determining a first deviation between the estimated first drive shaft torque and the estimated second drive shaft torque each obtained at a first time point;

determining a second deviation between the estimated first drive shaft torque and the estimated second drive shaft torque each obtained at a second time point, when a value of the estimated second drive shaft torque becomes equal to the value estimated at the first time point;

determining a start of correction when a difference between the first deviation and the second deviation becomes larger than a predetermined value; and performing a correction of the characteristics of the torque converter.

11. A control method for a powertrain of a vehicle according to claim 10, wherein said second estimating step is performed with a torque sensor mounted on the drive shaft.

12. A control method for a powertrain of a vehicle according to claim 10, wherein said second estimating step is performed by using signals detected from a vehicle weight detector and an acceleration detector.

13. A control method for a powertrain of a vehicle according to claim 12, wherein said second estimating step further includes:

estimating a change in vehicle weight by measuring when the vehicle speed is continuously equal to zero for a predetermined time period; and re-estimating the second drive shaft torque based on a newly detected signal from the vehicle weight detector.

14. A control method for a powertrain of a vehicle according to claim 12, wherein the vehicle weight detector determines the vehicle weight through calculation by using a first speed and a first acceleration detected at a first time point and a second speed and a second acceleration detected at a second time point.

15. A control method for a powertrain of a vehicle according to claim 10, wherein said learning and correcting step further includes:

receiving at least one of a steering angle signal from a steering angle detecting means and a road condition detection signal from a road condition detecting means; and determining whether or not to continue the learning and correcting operation thereof, based on the received signals.

16. A control method for a powertrain of a vehicle according to claim 15, wherein a float signal for detecting residual fuel in a fuel tank is used as a road condition detection signal.

17. A control method for a powertrain of a vehicle according to claim 10, wherein said learning and correcting step further includes:

generating an abnormality detecting signal and outputting the same when a number of corrections for the characteristics of the torque converter exceeds a predetermined number, or an accumulated correction for the characteristics of the torque converter exceeds a predetermined amount.

18. A control method for a powertrain of a vehicle including a drive unit having a motor, an automatic transmission with a torque converter, and a drive shaft comprising:

estimating a first drive shaft torque by means of a first drive shaft torque determining method using inherent initial characteristics of the torque converter, and outputting a signal representing the estimated first drive shaft torque so as to use the same for control of the powertrain;

storing a relationship between an acceleration of the vehicle and a second drive shaft torque output by the drive unit as initial values;

comparing the signal representing the estimated first drive shaft torque with a signal representing an initially stored second drive shaft torque and modifying the initial characteristics of the torque converter based on the comparison result, whereby signals representing corrected estimated first drive shaft torques are output thereafter based on the modified characteristics of the torque converter;

detecting completion of correction of the initial characteristics of the torque converter; and inhibiting application of a signal representing the estimated first drive shaft torque for control of the powertrain if the correction completion is not detected.

* * * * *